US008755674B2

(12) United States Patent
Nakajima et al.

(10) Patent No.: US 8,755,674 B2
(45) Date of Patent: *Jun. 17, 2014

(54) INFORMATION RECORDING APPARATUS AND METHOD, INFORMATION PROCESSING TERMINAL, MEDIUM AND APPARATUS, AND RECORDING MEDIUM

(75) Inventors: Yasuhisa Nakajima, Kanagawa (JP); Susumu Masukane, Tokyo (JP)

(73) Assignee: Sony Corporation (JP)

( * ) Notice: Subject to any disclaimer, the term of this patent is extended or adjusted under 35 U.S.C. 154(b) by 1536 days.

This patent is subject to a terminal disclaimer.

(21) Appl. No.: 11/726,809

(22) Filed: Mar. 23, 2007

(65) Prior Publication Data

US 2007/0172198 A1    Jul. 26, 2007

Related U.S. Application Data

(63) Continuation of application No. 09/930,773, filed on Aug. 16, 2001, now Pat. No. 7,212,729.

(30) Foreign Application Priority Data

Aug. 21, 2000    (JP) .............................. P2000-249616

(51) Int. Cl.
| H04N 5/76 | (2006.01) |
| H04N 5/775 | (2006.01) |
| H04N 21/4147 | (2011.01) |
| H04N 21/4227 | (2011.01) |
| H04N 21/4335 | (2011.01) |
| H04N 5/445 | (2011.01) |
| H04N 21/433 | (2011.01) |
| H04N 21/472 | (2011.01) |

(52) U.S. Cl.
CPC ................ *H04N 5/76* (2013.01); *H04N 5/775* (2013.01); *H04N 21/4147* (2013.01); *H04N 5/44543* (2013.01); *H04N 21/4227* (2013.01); *H04N 21/4334* (2013.01); *H04N 21/4335* (2013.01); *H04N 21/47214* (2013.01)
USPC ............ 386/291; 386/294; 386/295; 386/299

(58) Field of Classification Search
CPC ..... H04N 5/76; H04N 5/775; H04N 5/44543; H04N 21/4147; H04N 21/4227; H04N 21/4334; H04N 21/4335; H04N 21/47214
USPC .................................................. 386/291–299
See application file for complete search history.

(56) References Cited

U.S. PATENT DOCUMENTS

| 5,164,839 A | 11/1992 | Lang |
| 5,555,015 A | 9/1996 | Aguayo, Jr. et al. |

(Continued)

FOREIGN PATENT DOCUMENTS

| JP | 6-036388 A | 2/1994 |
| JP | 11-195256 A | 7/1999 |

(Continued)

*Primary Examiner* — Gelek W Topgyal
(74) *Attorney, Agent, or Firm* — Lerner, David, Littenberg, Krumholz & Mentlik, LLP

(57) ABSTRACT

New content is recorded onto a recording medium. Whether the current free recording capacity of the recording medium is sufficient to record the new content is determined. When the current free recording capacity of the recording medium is sufficient, the new content onto the recording medium is recorded. When the current free recording capacity of the recording medium is insufficient, a notification regarding the current free recording capacity of the recording medium is sent over a network to an information processing terminal, an instruction transmitted over the network by the information processing terminal is received, and at least a portion of prior content recorded on the recording medium is processed based on the instruction.

42 Claims, 24 Drawing Sheets

(56) References Cited

U.S. PATENT DOCUMENTS

| | | | |
|---|---|---|---|
| 6,359,557 B2 * | 3/2002 | Bilder | 340/531 |
| 6,577,806 B1 | 6/2003 | Hirota | |
| 6,637,027 B1 | 10/2003 | Breslauer et al. | |
| 6,678,463 B1 * | 1/2004 | Pierre et al. | 386/291 |
| 6,865,746 B1 * | 3/2005 | Herrington et al. | 725/53 |
| 6,920,641 B1 | 7/2005 | Hanai et al. | |
| 7,088,910 B2 * | 8/2006 | Potrebic et al. | 386/291 |
| 7,673,315 B1 * | 3/2010 | Wong et al. | 725/51 |
| 2001/0014206 A1 * | 8/2001 | Artigalas et al. | 386/83 |
| 2003/0095791 A1 * | 5/2003 | Barton et al. | 386/83 |
| 2005/0028208 A1 | 2/2005 | Ellis et al. | |

FOREIGN PATENT DOCUMENTS

| | | |
|---|---|---|
| JP | 11-331716 A | 11/1999 |
| JP | 2000-020268 A | 1/2000 |
| JP | 2000-165788 A | 6/2000 |

* cited by examiner

FIG. 15A

THE FREE CAPACITY IS SHORT.
SHOULD A RECORDED PROGRAM BE ERASED?

YES
NO

FIG. 15B

THE PROGRAM CANNOT BE RECORDED BECAUSE THE FREE CAPACITY IS SHORT.

FIG. 15C

WHICH PROGRAM SHOULD BE ERASED?

1. NEWS/WEATHER FORECAST
   CH1   9:00

2. WIDE SHOW
   CH8  15:00

RETURN

FIG. 15D

SHOULD THIS PROGRAM BE ERASED?

NEWS/WEATHER FORECAST
CH1  9:00
RECORDING DATE: JUNE 30, 2000
RECORDING TIME: 30 MINUTES

YES
NO

FIG. 15E

THE NEWS/WEATHER FORECAST HAS BEEN ERASED.

FIG. 15F

THE CAPACITY IS ASSURED.

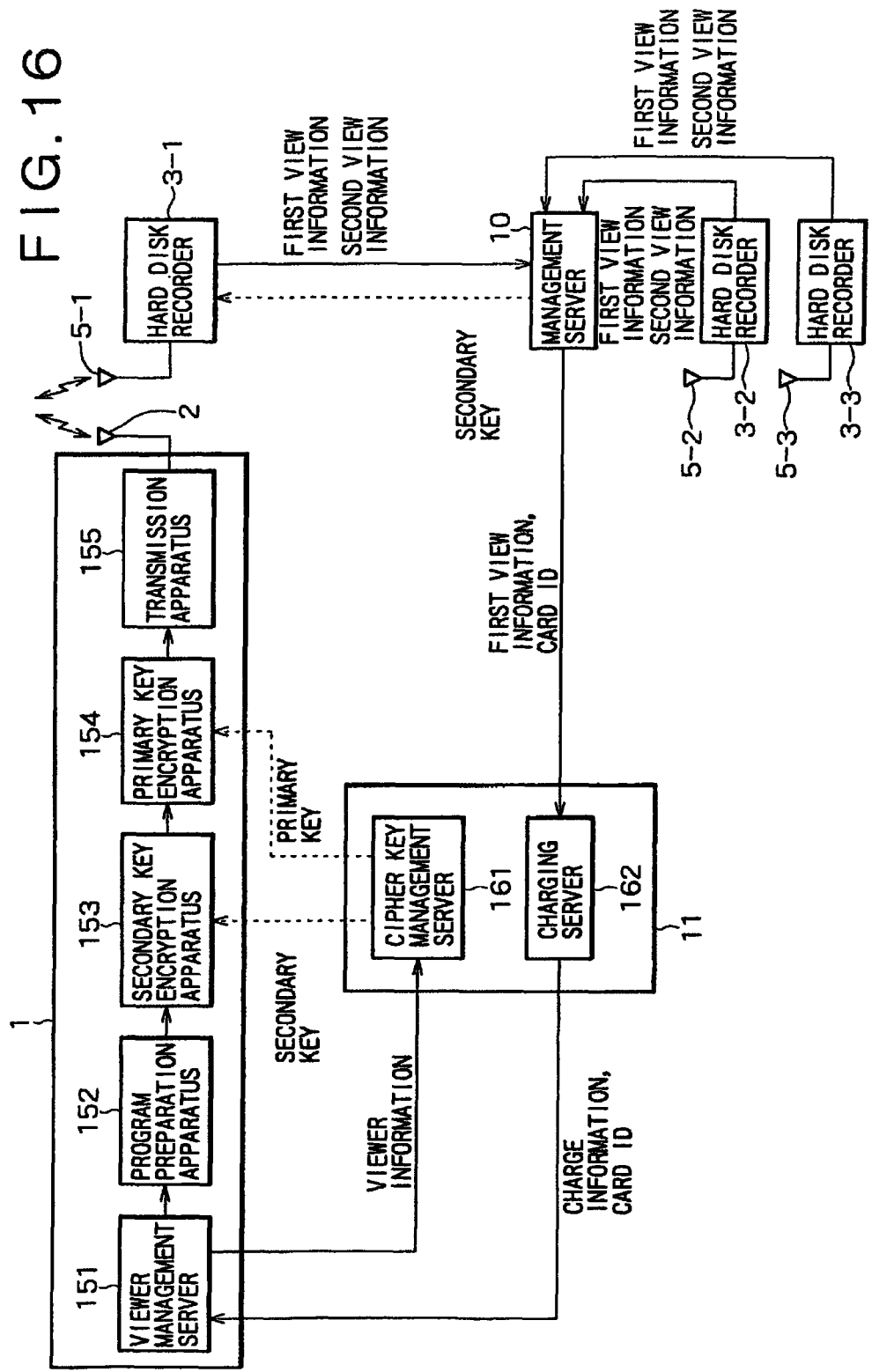

FIG. 22A

COMMODITY GUIDE PROGRAM (15 MINUTES)

STREAM 1

FIG. 22B

| COMMODITY GUIDE PROGRAM (8 MINUTES) | RECORDING PROGRAM (5 MINUTES) | COMMODITY GUIDE PROGRAM (7 MINUTES) |

STREAM 2

INFORMATION RECORDING APPARATUS AND METHOD, INFORMATION PROCESSING TERMINAL, MEDIUM AND APPARATUS, AND RECORDING MEDIUM

CROSS-REFERENCE TO RELATED APPLICATIONS

The present application is a continuation of U.S. application Ser. No. 09/930,773, filed Aug. 16, 2001 now U.S. Pat. No. 7,212,729, which claims priority from Japanese Application No. P2000-249616, filed Aug. 21, 2000, the disclosures of which are hereby incorporated by reference herein.

BACKGROUND OF THE INVENTION

This invention relates to an information recording apparatus and method, an information processing terminal, method and apparatus and a recording medium, and more particularly to an information recording apparatus and method, an information processing terminal, method and apparatus and a recording medium wherein unattended recording is executed.

In recent years, a recording and playback apparatus which records a television program onto a recording medium such as a hard disk or an optical disk has been developed and put into practical use. By using a recording and playback apparatus of the type mentioned to record a television broadcast by unattended recording, a user can enjoy the television broadcast later even if the user is out at the broadcast time of the television broadcast.

However, even if the recording medium has a sufficient remaining storage capacity when a user presets unattended recording, the storage capacity of the recording medium may become short, for example, because a family records some other program while the user is out. If the user is at home, then the user can erase data of a program which has been recorded already onto another recording medium in response to a warning from the recording and playback apparatus to make it possible to execute the unattended recording. However, if the user is out, such a problem occurs that, for example, only part of the program preset for unattended recording is recorded or the recording and playback apparatus erases a program recorded already in accordance with its own decision.

SUMMARY OF THE INVENTION

It is an object of the present invention to provide an information recording apparatus and method, an information processing terminal, method and apparatus and a recording medium by which unattended recording can be executed in accordance with a set condition even when there is insufficient free storage capacity in the recording medium of a recording and playback apparatus.

In order to attain the object described above, according to the present invention, when a notification of insufficient storage capacity in the recording medium is received from a recording and playback apparatus, recorded contents of the recording and playback apparatus are operated from a communication terminal so that unattended recording may be executed in accordance with a set condition.

In particular, according to an aspect of the present invention, there is provided an information recording apparatus for recording new contents onto a recording medium which includes a recording unit operable to record new contents onto the recording medium; a notification unit operable to send a notification to an information processing terminal regarding a recording capacity of the recording medium; a receiver capable to receive an instruction transmitted from the information processing terminal in response to the notification; and a processor operable to process prior contents recorded on the recording medium in accordance with the instruction.

The notification may include titles of the prior contents recorded on the recording medium, and the processor may erase a designated one of the prior contents in accordance with the instruction.

The information recording apparatus may further include a presetting unit operable to preset unattended recording of the new contents onto the recording medium, and a determination unit operable to determine a free capacity of the recording medium for recording the new contents, the notification unit sending the notification to the information processing terminal based on the free capacity.

The presetting unit may search for contents to be broadcast which all belong to a designated genre and preset so that the searched out contents may be recorded onto the recording medium.

According to another aspect of the present invention, there is provided a method for recording new contents onto a recording medium, the method including initiating a process to record new contents onto the recording medium; sending a notification to an information processing terminal regarding a recording capacity of the recording medium; receiving an instruction transmitted from the information processing terminal in response to the notification; and processing prior contents recorded on the recording medium in accordance with the instruction.

According to a further aspect of the present invention, there is provided a recording medium recorded with a computer-readable program for recording new contents onto a recording medium, the program including initiating a process to record new contents onto the recording medium; sending a notification to an information processing terminal regarding a recording capacity of the recording medium; receiving an instruction transmitted from the information processing terminal in response to the notification; and processing prior contents recorded on the recording medium in accordance with the instruction.

With the information recording apparatus, the information recording method and the program of the recording medium, a notification of information regarding a recording capacity of the recording medium, on which prior contents are recorded, is issued to the information recording terminal, and an instruction transmitted from the information processing terminal in response to the notification is received. Then, one of the prior contents recorded on the recording medium is processed in accordance with the received instruction. Consequently, new contents to be recorded can be recorded with certainty.

According to a still further aspect of the present invention, there is provided an information processing terminal connectable to an information processing apparatus which controls an information recording apparatus for recording contents onto a recording medium through a network, including a receiver operable to receive a notification issued from the information recording apparatus when the recording medium has insufficient free capacity to record new contents; a display unit operable to display the notification; an instruction unit operable to produce an instruction to control recording of the new contents onto the recording medium based on the notification; and a transmitter operable to transmit the instruction to the information recording apparatus.

The display unit may display titles of prior contents recorded on the recording medium, and the instruction may include one of the titles of the prior contents to be erased.

The receiver may receive the notification through the information processing apparatus, and the transmitter may transmit the instruction to the information recording apparatus through the information processing apparatus.

According to yet a further aspect of the present invention, there is provided a method for operating an information processing terminal connected to an information processing apparatus which controls an information recording apparatus for recording contents onto a recording medium through a network. The method includes receiving a notification from the information recording apparatus when the recording medium has insufficient free capacity to record new contents; displaying the notification; producing an instruction to control recording of the new contents onto the recording medium based on the notification; and transmitting the instruction to the information recording apparatus.

According to a still further aspect of the present invention, there is provided a recording medium recorded with a computer-readable program for operating an information processing terminal connected to an information processing apparatus which controls an information recording apparatus for recording contents onto a recording medium through a network. The program includes receiving a notification from the information recording apparatus when the recoding medium has insufficient free capacity to record new contents; displaying the notification; producing an instruction to control recording of the new contents onto the recording medium based on the notification; and transmitting the instruction to the information recording apparatus.

With the information processing terminal, the information processing method and the program of the recording medium, when the recording medium onto which contents are to be recorded by the information recording apparatus has insufficient free capacity, a notification issued from the information recording apparatus is received through the network, and the received notification is displayed. Then, an instruction to control recording of the new contents onto the recording medium, that is, an instruction to process recorded contents of the recording medium provided in the information recording apparatus, is produced based on the displayed notification, and the instruction is transmitted to the information recording apparatus. Consequently, new contents to be recorded can be recorded with certainty onto the recording medium.

According to a yet further aspect of the present invention, there is provided an information processing apparatus operable between an information recording apparatus for recording contents onto a recording medium and an information processing terminal for controlling the information recording apparatus through a network, including a first receiver operable to receive a first notification produced by the information recording apparatus when the recording medium has insufficient free capacity to record new contents; a notification unit operable to issue to the information processing terminal a second notification indicating receipt of the first notification by the first receiver; a second receiver operable to receive an instruction from the information processing terminal based on the second notification; and a transmitter operable to transmit to the information recording apparatus a signal for controlling recording of the new contents onto the recording medium based on the instruction.

The notification unit may issue a notification of titles of prior contents recorded on the recording medium, and the transmitter may transmit a signal for erasing a designated one of the prior contents in accordance with the instruction.

According to yet a further aspect of the present invention, there is provided a method for operating an information processing apparatus interposed between an information recording apparatus for recording contents onto a recording medium and an information processing terminal for controlling the information recording apparatus through a network. The method includes receiving a first notification produced by the information recording apparatus when the recording medium onto which new contents are to be recorded has insufficient free capacity to record the new contents; issuing to the information processing terminal a second notification indicating receipt of the first notification; receiving an instruction from the information processing terminal based on the second notification; and transmitting to the information recording apparatus a signal for controlling recording of the new contents onto the recording medium based on the instruction.

According to still a further aspect of the present invention, there is provided a recording medium recorded with a computer-readable program for operating an information processing apparatus interposed between an information recording apparatus for recording contents onto a recording medium and an information processing terminal for controlling the information recording apparatus through a network. The program includes receiving a first notification produced by the information recording apparatus when the recording medium has insufficient free capacity to record new contents; issuing to the information processing terminal a second notification indicating receipt of the first notification; receiving an instruction from the information processing terminal based on the second notification; and transmitting to the information recording apparatus a signal for controlling recording of the new contents onto the recording medium based on the instruction.

With the information processing apparatus, the information processing method and the program of the recording medium, a first notification produced by the information recording apparatus when the recording medium onto which contents are to be recorded has insufficient free capacity is received from the information recording apparatus, and when the first notification is received, a second notification indicating this is issued to the information processing terminal. Then, an instruction from the information processing terminal based on the second notification is received, and in accordance with the received instruction, a signal for controlling recording of the new contents onto the recording medium is transmitted to the information recording apparatus through the network. Consequently, a system wherein contents to be recorded can be recorded with certainty onto the recording medium can be implemented.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIGS. 15A to 15F are schematic views showing different examples of displays of the mobile phone;

FIG. 16 is a block diagram showing an example of a configuration of an information processing system;

FIGS. 22A and 22B are diagrammatic views illustrating different examples of streams played back by the hard disk recorder.

DETAILED DESCRIPTION

Figure 1:
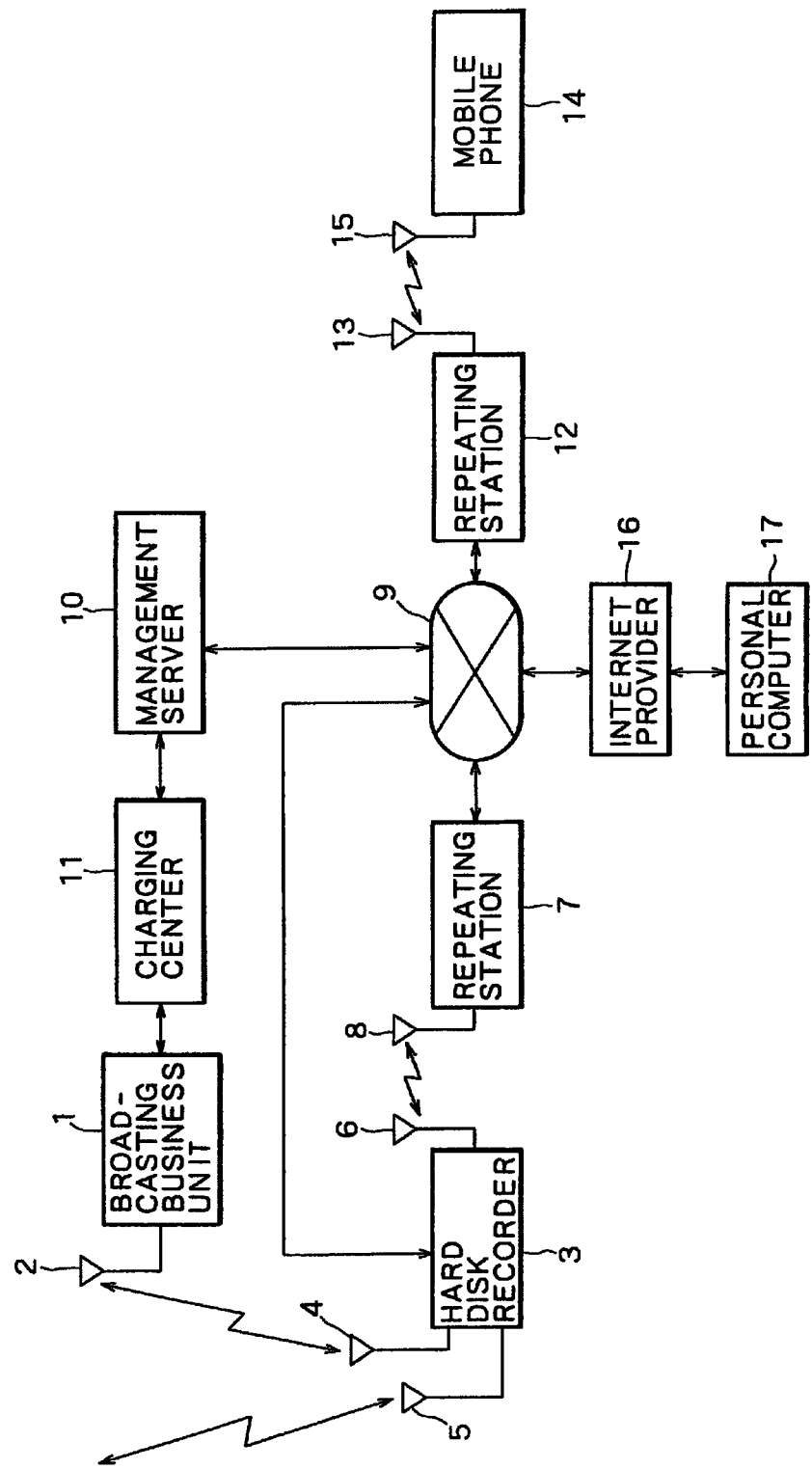
FIG. 1 is a block diagram showing an example of a configuration of a recording management system to which the present invention is applied.

Referring first to FIG. 1, there is shown an example of a configuration of a recording management system to which the present invention is applied. The recording management system includes a broadcasting business unit 1 which executes necessary processes such as, for example, multiplexing or encryption for a television program to produce an MPEG (Motion Picture Experts Group) transport stream and transmits the MPEG transport stream as a television broadcast wave from a broadcasting antenna 2.

The television broadcast wave transmitted from the broadcasting antenna 2 is received by a hard disk recorder 3 through a satellite (not shown) and a satellite antenna 5 connected to the hard disk recorder 3.

The hard disk recorder 3 records the received television program onto a hard disk (not shown) built therein. Thereafter, the user of the hard disk recorder 3 can play back the television program recorded on the hard disk and enjoy the television program using a monitor or a speaker (not shown).

The user can preset unattended recording of a television program to be recorded to the hard disk recorder 3. For presetting of unattended recording, for example, a method wherein schedule information of television programs is confirmed and a program to be recorded is designated to the hard disk recorder 3 may be used, or another method wherein a favorable genre is designated so that all programs which belong to the genre are designated so as to be recorded by the hard disk recorder 3 may be used.

The hard disk recorder 3 determines, before the broadcast time arrives for the program set for unattended recording, whether the hard disk has a free capacity sufficient to record the program. If the hard disk recorder 3 determines that the hard disk does not have sufficient free capacity, then it starts communication by radio through a communication antenna 6 in order to send to a notification destination set in advance by the user a notification that there is not sufficient capacity. Therefore, the user must designate a terminal, such as a mobile phone 14 or a personal computer 17 of the user itself, as the notification destination before the user performs presetting of unattended recording of a television program.

The notification information transmitted by radio from the communication antenna 6 is received by a repeating antenna 8 of the nearest repeating station 7 and then transmitted to a management server 10 over a network 9 including the Internet.

The management server 10 converts the notification information transmitted thereto from the hard disk recorder 3 into information of an output format for the mobile phone 14 or the personal computer 17 designated in advance as the destination of notification information by the user.

The management server 10 transmits the notification information obtained by the conversion to, for example, where the mobile phone 14 is designated as the notification destination, the mobile phone 14 from another repeating station 12 through a repeating antenna 13. On the other hand, where the personal computer 17 is designated as the notification destination, the notification information transmitted from the management server 10 is transmitted to the personal computer 17 through an Internet provider 16.

The user will confirm the notification information on the mobile phone 14 and send an instruction to the hard disk recorder 3 to perform a suitable process, such as to erase program data recorded already by the hard disk recorder 3, using the mobile phone 14. The instruction information from the mobile phone 14 is transmitted from a communication antenna 15 and sent to the hard disk recorder 3 through the management server 10.

The user of the mobile phone 14 or the personal computer 17 can not only operate the hard disk recorder 3 in response to the notification from the hard disk recorder 3, but also can access the hard disk recorder 3 from the mobile phone 14 or the personal computer 17 to operate the hard disk recorder 3.

A charging center 11 charges a fee for the television program recorded in the hard disk recorder 3. Further, the charging center 11 provides a cipher key (scramble key) for encrypting (scrambling) the television program to the broadcasting business unit 1 and provides a decipher key (descramble key) for decrypting (descrambling) the television program to the hard disk recorder 3.

Figure 2:
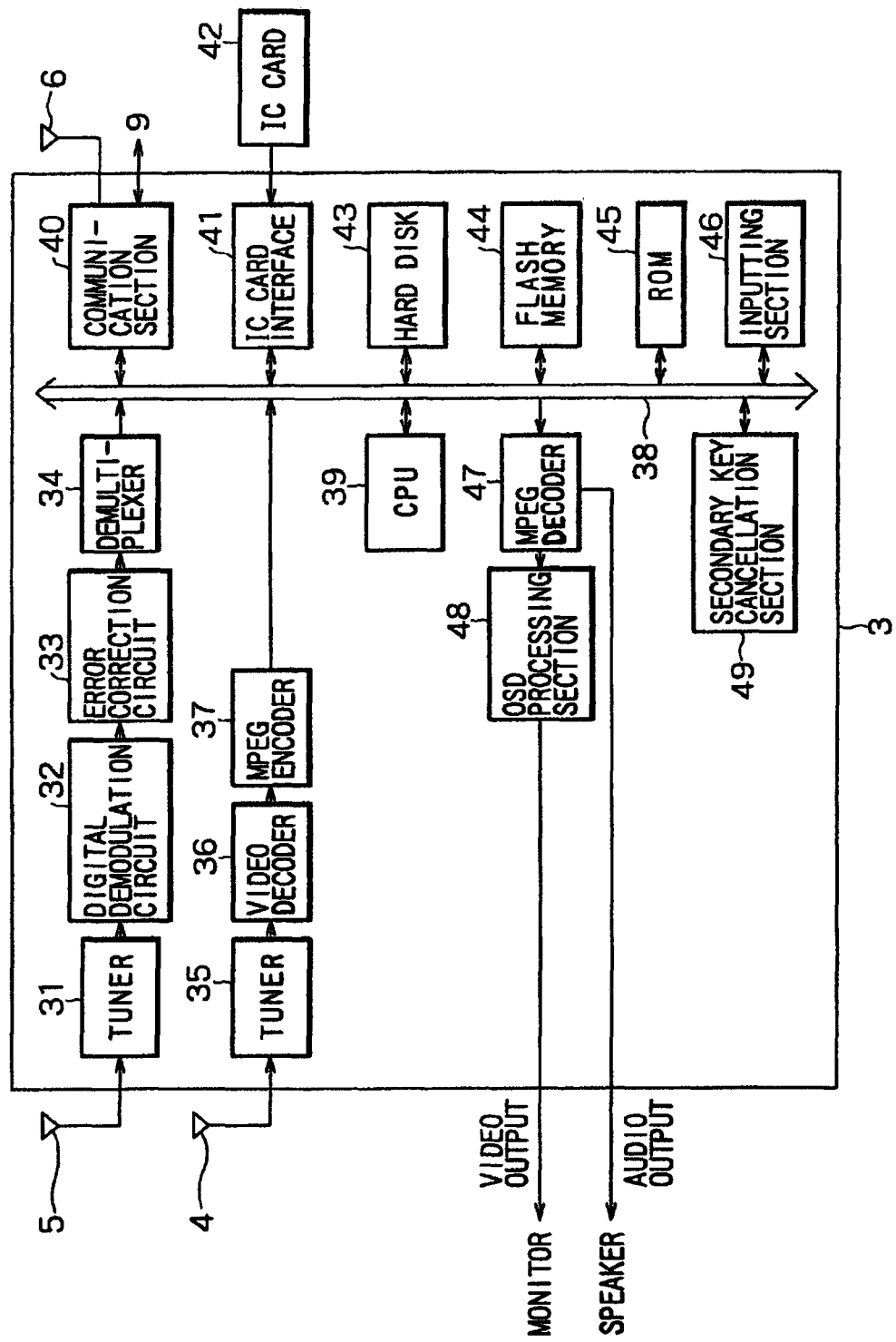
FIG. 2 is a block diagram showing an example of a configuration of a hard disk recorder shown in FIG. 1.

FIG. 2 shows an example of a configuration of the hard disk recorder 3. Referring to FIG. 2, a tuner 31 selects a broadcast wave corresponding to a channel selected by the user from among broadcast waves transmitted from the broadcasting business unit 1 and received by the satellite antenna 5 through a satellite (not shown). The tuner 31 supplies the selected broadcast wave to a digital demodulation circuit 32.

The digital demodulation circuit 32 QPSK (Quadrature Phase Shift Keying) demodulates the broadcast wave supplied thereto from the tuner 31 to obtain a transport stream and outputs the transport stream to an error correction circuit 33.

The error correction circuit 33 performs error correction processing for the transport stream supplied thereto and outputs a resulting transport stream to a demultiplexer 34.

The demultiplexer 34 extracts a transport stream packet (video data and audio data regarding the program whose recording is designated by the user) from the transport stream supplied thereto from the error correction circuit 33.

A central processing unit (CPU) 39 decodes a transport stream packet (hereinafter referred to as TS packet) obtained by the processing of the demultiplexer 34 using a cipher key (primary key) and controls a hard disk 43 to record a resulting TS packet (where the resulting TS packet is a program (channel) encrypted (scrambled) with a secondary key, the TS packet in the encrypted (scrambled) state). A cipher key (descramble key) to be used by the CPU 39 is supplied from an IC (Integrated Circuit) card 42 through an IC card interface 41. It is to be noted that encryption of data is hereinafter described in detail.

Meanwhile, a tuner 35 receives a ground wave of a channel designated by the user from among analog ground waves transmitted from a predetermined broadcasting station or stations through a ground wave antenna 4 and outputs the ground wave to a video decoder 36.

The video decoder 36 converts the analog data supplied thereto from the tuner 35 into digital data and outputs the digital data to an MPEG encoder 37.

The MPEG encoder 37 compresses the digital data from the video decoder 36 in accordance with the MPEG 2 system to produce a TS packet. The TS packet produced by the MPEG encoder 37 is recorded onto the hard disk 43 through a system bus 38 in accordance with an instruction from the CPU 39.

If an instruction to play back program data recorded on the hard disk 43 is issued by the user of the hard disk recorder 3, then the CPU 39 descrambles the TS packet recorded on the hard disk 43 using a cipher key (secondary key) supplied thereto from a storage section (not shown) of a secondary key cancellation section 49 and outputs a resulting TS packet to an MPEG decoder 47. The CPU 39 accesses, if the data of the TS packet are scrambled with the secondary key, the management server 10 using a portable telephone function of a communication section 40 to acquire the secondary key. It is to be noted that the acquired secondary key is stored in the storage section (not shown) of the secondary key cancellation section 49. Then, the data deciphered with the secondary key are supplied to the MPEG decoder 47.

The MPEG decoder 47 decodes the TS packet supplied thereto and converts the decoded TS packet into an analog video signal and an analog audio signal. The MPEG decoder 47 outputs the video signal to an OSD (On Screen Display) processing section 48 and outputs the audio signal to a speaker, not shown in FIG. 2.

The OSD processing section 48 superposes necessary information on the analog video signal supplied thereto from the MPEG decoder 47 and outputs a resulting signal to a monitor, not shown in FIG. 2.

The communication section 40 communicates with another communication apparatus (not shown) by radio through the communication antenna 6 in accordance with an instruction of the CPU 39. Further, the communication section 40 is connected to the network 9 by a wire and transmits view information of a television program viewed by the user using the hard disk recorder 3 to the management server 10.

A flash memory 44 stores information acquired from an external apparatus (not shown) in response to an instruction of the CPU 39. For example, information of a notification destination to be used when the free capacity of the hard disk 43 is insufficient is stored in the flash memory 44.

A ROM (Read Only Memory) 45 stores programs, fixed data and so forth to be used by the CPU 39 to control the blocks.

An inputting section 46 is formed from switch buttons, a remote commander or the like, and receives instructions for the hard disk recorder 3 as input by the user.

The hard disk recorder 3 must acquire position information corresponding to the position at which it is located and time information, and must be initialized before a television program designated by the user is recorded. The position information is set because the television programs broadcast from a broadcasting station may be different depending upon the district. Further, for example, in the United States, the time is different among different districts, and therefore, the position information is required in order to determine which district's time should be set.

Figure 3:
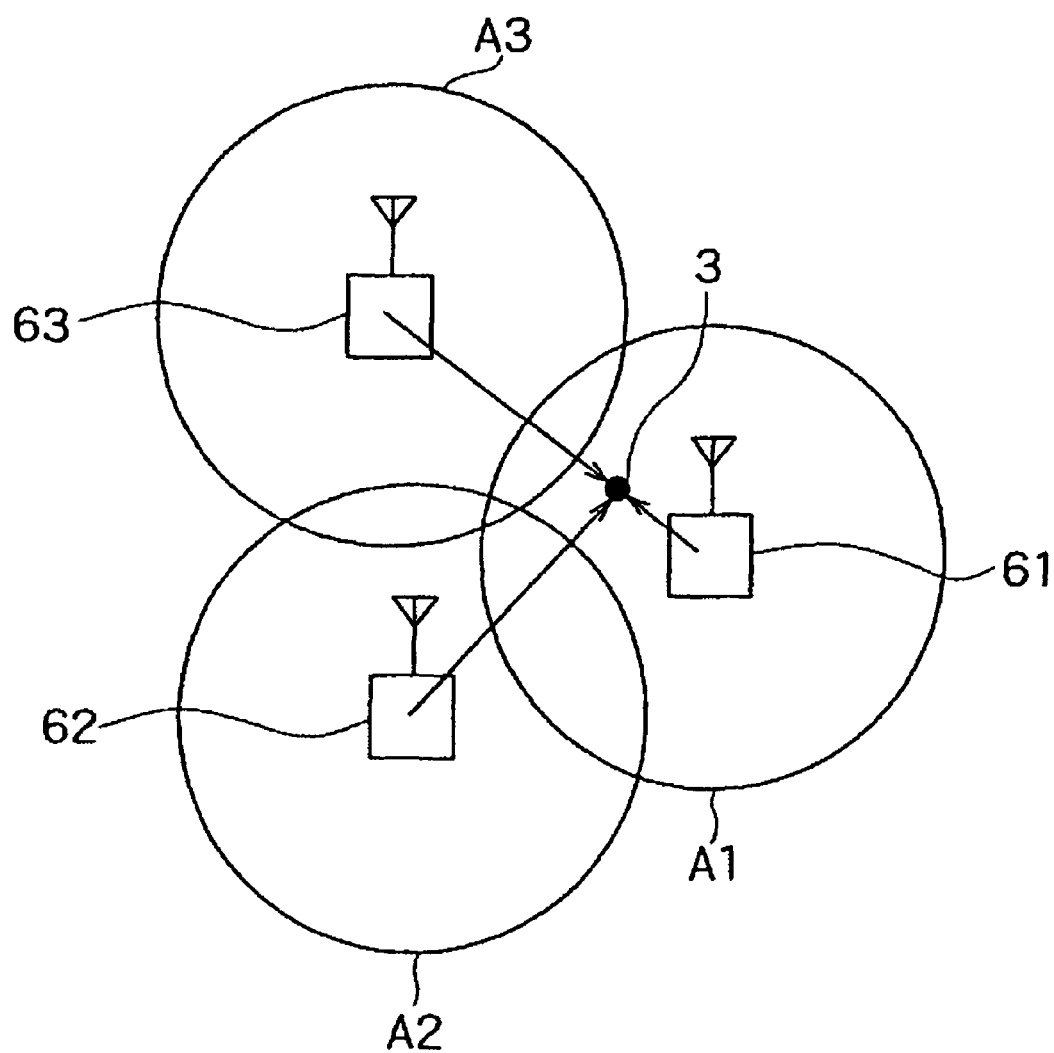
FIG. 3 is a diagrammatic view illustrating initialization of the hard disk recorder.

FIG. 3 illustrates initialization of the hard disk recorder 3. The initialization is started when power is supplied for the first time to the hard disk recorder 3 or each time an instruction for such initialization is issued by the user. The hard disk recorder 3 uses the communication section 40 thereof to communicate with a repeating station 61, which is nearest to the hard disk recorder 3 itself, to acquire necessary information.

The repeating stations 61 to 63 manage communications performed by communication terminals (including the hard disk recorder 3) within a radius of several kilometers. A radio wave region A1 is a range within which a radio wave transmitted from the repeating station 61 reaches; another radio wave region A2 is a range within which a radio wave transmitted from the repeating station 62 reaches; and a further radio wave region A3 is a range within which a radio wave transmitted from the repeating station 63 reaches.

The initialization of the hard disk recorder 3 is described below with reference to the flowcharts of FIGS. 4 and 5.

Figure 4:
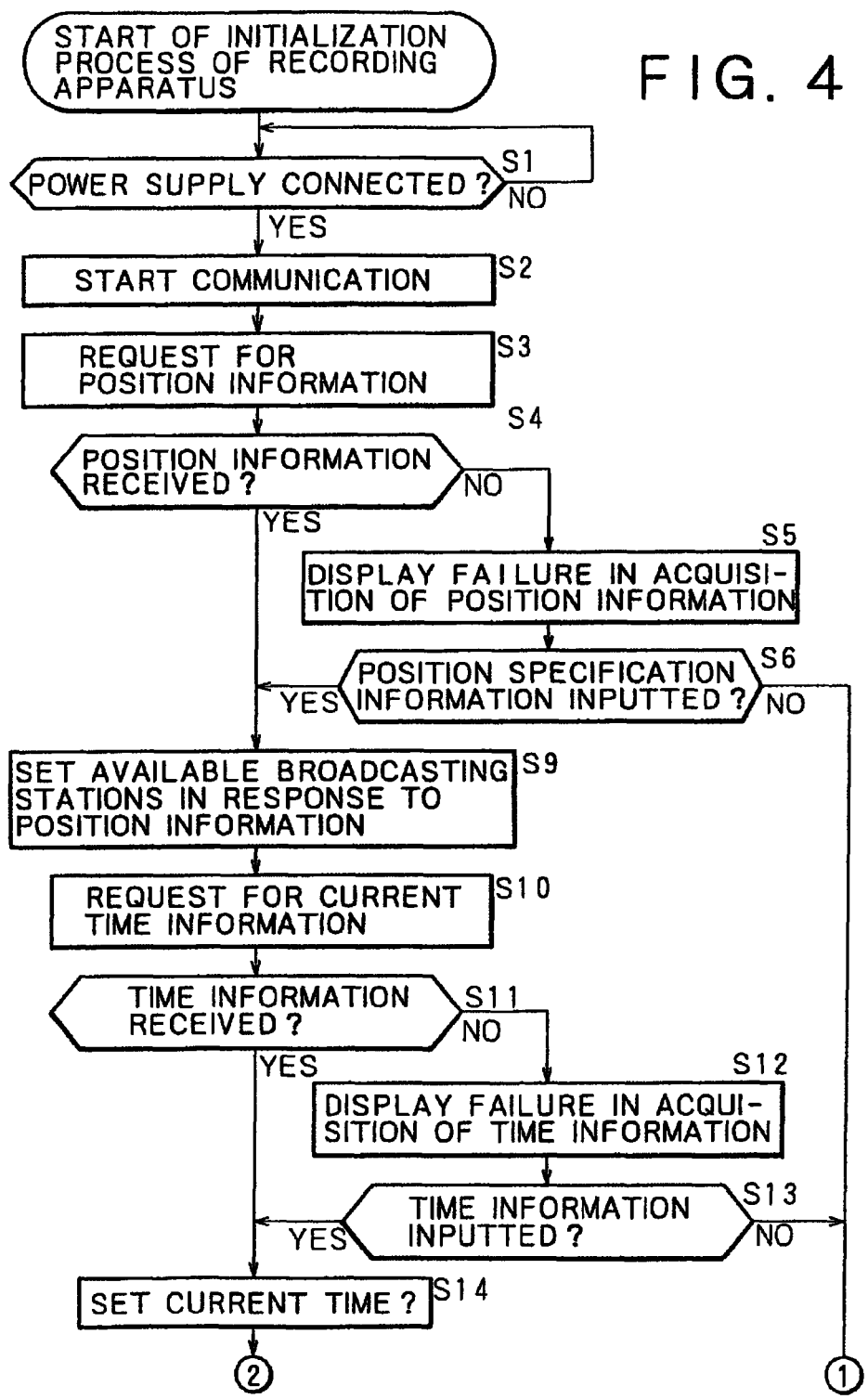
FIGS. 4 and 5 are flowcharts illustrating initialization of the hard disk recorder.

Referring first to FIG. 4, the CPU 39 first determines in step S1 whether a power supply is connected. An initialization program for the hard disk recorder 3 is stored in the ROM 45 so that it may be started when power is supplied from a power supply section (not shown), and the CPU 39 waits in accordance with the program until power is supplied. If the CPU 39 determines in step S1 that power has been supplied from a power supply section, then the process advances to step S2.

In step S2, the CPU 39 controls the communication section 40 to start communication with the repeating station 61.

Then in step S3, the CPU 39 requests the repeating station 61 for position information of the CPU 39 itself. In order to satisfy the request, the repeating station 61 calculates position information of the hard disk recorder 3 based on a radio wave transmitted from the hard disk recorder 3. The repeating station 61 can refer also to reception conditions of the radio wave from the hard disk recorder 3 detected by the repeating stations 62 and 63 to calculate position information of the hard disk recorder 3 with a high degree of accuracy. Or, where the range of the radio wave region A1 is sufficiently small, the repeating station 61 can transmit position information representative of the position of the repeating station 61 itself as position information of the hard disk recorder 3.

Then in step S4, the CPU 39 determines whether a notification of position information has been received from the repeating station 61. If the CPU 39 determines that the position information cannot be acquired since no radio wave has been received from the repeating station 61, then the process advances to step S5.

In step S5, the CPU 39 controls the OSD processing section 48 to display on its monitor a message indicating that position information cannot be acquired and further to display another message indicating that the user is requested to input position specification information (such as, for example, a zip code or a district code set in advance).

Then in step S6, the CPU 39 determines whether position specification information has been input by the user. If the CPU 39 determines that no position specification information has been input, then the process advances to step S7 illustrated in FIG. 5.

Figure 5:
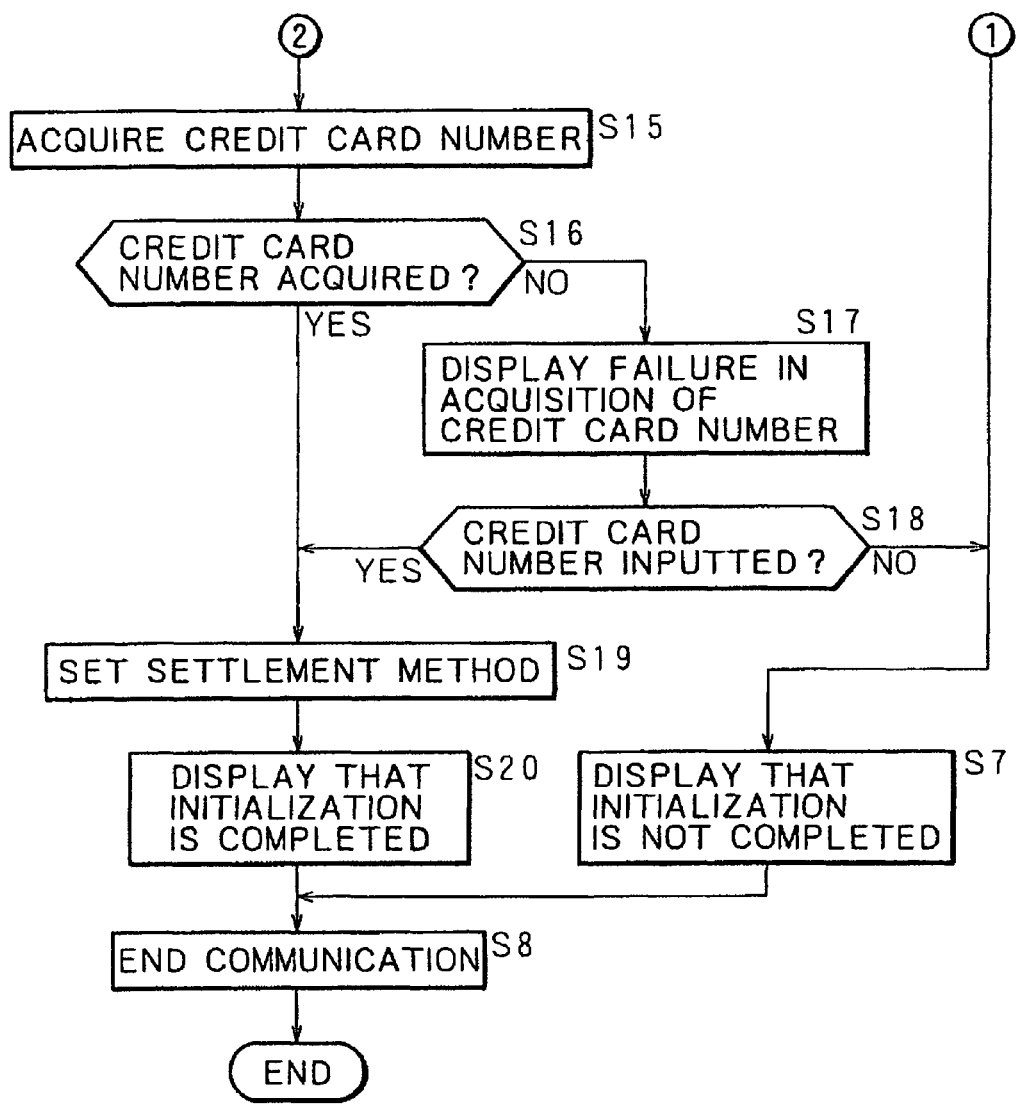

Referring to FIG. 5, in step S7, the CPU 39 controls the monitor to display a message indicating that the initialization has not been completed as yet to notify the user of this. Thereafter, the process advances to step S8, in which the CPU 39 ends the communication with the repeating station 61, whereafter it ends the process.

Referring back to FIG. 4, if the CPU 39 determines in step S4 that a notification of position information has been received from the repeating station 61 or determines in step S6 that position specification information has been input by the user, then the process advances to step S9.

In step S9, the CPU 39 sets broadcasting stations (channels) of television broadcast waves received by the ground wave antenna 4 based on the notification from the repeating station 61 or the position information input by the user and stores the set broadcasting stations in the flash memory 44. For example, if the hard disk recorder 3 is installed at a place in Shinjuku-ku, Tokyo, Japan, the channel numbers of broadcasting stations which can be received by the ground wave antenna 4 are set to the channels 1, 3, 4, 6, 8, 10 and 12. Specification codes of broadcasting stations corresponding to position information are set in advance in the ROM 45.

After the broadcasting stations have been set, the process advances to step S10, in which the CPU 39 requests the repeating station 61 for current time information.

Then in step S11, the CPU 39 determines whether a notification of time information has been received from the repeating station 61. If the CPU 39 determines that no notification of time information has been received from the repeating station 61 since a radio wave has not been received from the repeating station 61, then the process advances to step S12.

In step S12, the CPU 39 controls the monitor to display a message indicating that time information cannot be acquired and further to display another message indicating that the user is requested to input time information.

Then in step S13, the CPU 39 determines whether time information has been input by the user. If the CPU 39 determines that no time information has been input, then the process advances to step S7 of FIG. 5.

Referring to FIG. 5, in step S7, the CPU 39 controls the monitor to display a message indicating that the initialization has not been completed as yet. Thereafter, the process advances to step S8. In step S8, the CPU 39 ends the communication with the repeating station 61. Thereafter, the CPU 39 ends the process.

Referring back to FIG. 4, if the CPU 39 determines in step Sll that a notification of time information has been received from the repeating station 61 or determines in step S13 that time information has been input by the user, then the process advances to step S14. In step S14, the CPU 39 sets the current time to the timer built therein based on the notification received from the repeating station 61 or the time information input by the user.

Referring now to FIG. 5, the CPU 39 acquires a credit card number of the user in the next step S15. When the user tries to perform a transaction through the network 9, it registers the number of its credit card into a predetermined server together with an address, the name, a telephone number, a mail address and so forth required for settlement of the transaction. Thus, the CPU 39 controls the communication section 40 to access a server registered in advance in the ROM 45 to request the predetermined server (for example, the management server 10 of FIG. 1) for notification of the credit card number of the user.

The CPU 39 acquires the credit card number of the user and sets it as a method of payment which should be used, for example, when the user views a program of commodity guidance and orders a commodity through the hard disk recorder 3. If order information of a commodity is input by the user, then the CPU 39 encrypts the credit card number and transmits it to the ordering destination without requesting the user to input of the credit card number every time.

The management server 10, which the hard disk recorder 3 requests to issue a notification of the credit card number as a result of the process in step S15, reads out a credit card number used by the user for payment of a communication charge for the hard disk recorder 3 or another credit card number used for payment of a service charge for the mobile phone 14 used by the mobile phone 14 and sends a notification of the credit card number to the hard disk recorder 3.

In step S16, the CPU 39 determines whether a notification of a credit card number has been received from the server. If the CPU 39 determines that a notification of a credit card number has not been received, then the process advances to step S17.

In step S17, the CPU 39 controls the OSD processing section 48 to display a message indicating that a credit card number cannot be acquired and to display another message indicating that the user is requested to input a credit card number.

Then in step S18, the CPU 39 determines whether a credit card number has been input by the user. If the CPU 39 determines that no credit card number has been input by the user, then the process advances to step S7.

In step S7, the CPU 39 controls the monitor to display a message indicating that the initialization has not been completed as yet. Thereafter, the process advances to step S8. In step S8, the CPU 39 controls the communication section 40 to end the communication. Thereafter, the CPU 39 ends the process.

On the other hand, if the CPU 39 determines in step S16 that a notification of a credit card number has been received from the server or determines in step S18 that a credit card number has been input by the user, then the process advances to step S19.

In step S19, the CPU 39 stores the credit card number in the flash memory 44 to set it as a method of payment when ordering information of a commodity is input by the user.

Then in step S20, the CPU 39 controls the monitor to display a message indicating that the initialization has been completed.

Then in step S8, the CPU 39 ends the communication with the repeating station 61. Thereafter, the CPU 39 ends the process.

In the foregoing, the CPU 39 requests the repeating station 61 for position information of the hard disk recorder 3 and time information. However, the CPU 39 may alternatively acquire such information from the management server 10 which manages information of the hard disk recorder 3.

Further, the CPU 39 may acquire setting information not through radio communication from the communication section 40 but through wire communication from the communication section 40.

Figure 6:
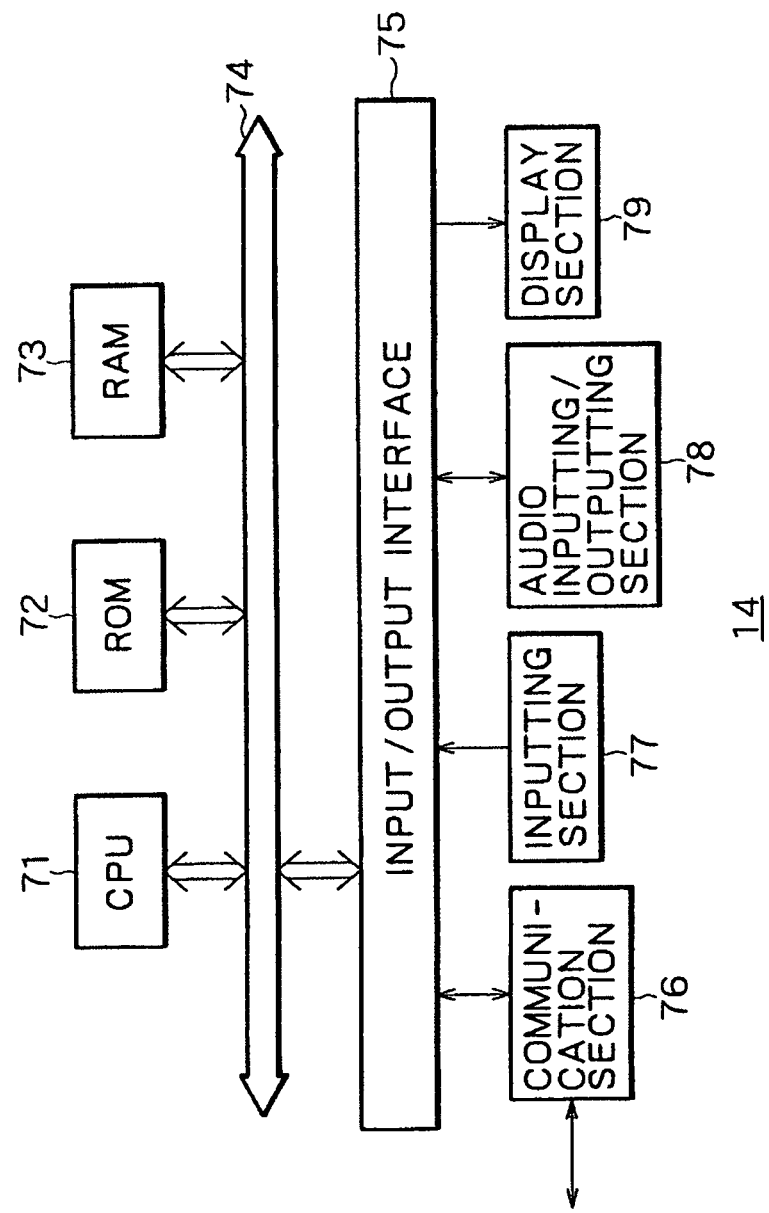
FIG. 6 is a block diagram showing an example of a configuration of a mobile phone shown in FIG. 1.

FIG. 6 shows an example of a configuration of the mobile phone 14.

Referring to FIG. 6, a CPU 71 controls operation of the entire mobile phone 14. A ROM 72 and a RAM (Random Access Memory) 73 are connected to the CPU 71 by a bus 74. Programs and fixed data necessary for control processing to be executed by the CPU 71 are stored in the ROM 72, and various data including working data necessary for processing of the CPU 71 are stored into the RAM 73.

An input/output interface 75 is connected to the CPU 71 by the bus 74, and various processing blocks are connected to the CPU 71 through the input/output interface 75.

A communication section 76 transmits a radio signal from the communication antenna 15 in accordance with an instruction of the CPU 71 to communicate with another communication terminal through the nearest repeating station.

An inputting section 77 is an operation section composed of switch buttons and so forth which are used to input a telephone number when the user tries to originate a telephone call. Further, the user operates the inputting section 77 to input an instruction for remotely controlling the hard disk recorder 3.

An audio inputting/outputting section 78 includes a microphone and a speaker and inputs and outputs voice when the mobile phone 14 is used as an ordinary telephone set.

A display section 79 is formed from an LCD (liquid crystal display) unit and displays, when a telephone function is executed, a telephone number of another mobile phone with which the mobile phone 14 communicates. Further, when the user of the mobile phone 14 remotely controls the hard disk recorder 3, the display section 79 displays various messages (such messages as illustrated in FIGS. 15A to 15F) transmitted thereto from the hard disk recorder 3 in accordance with an instruction from the CPU 71.

Figure 7:
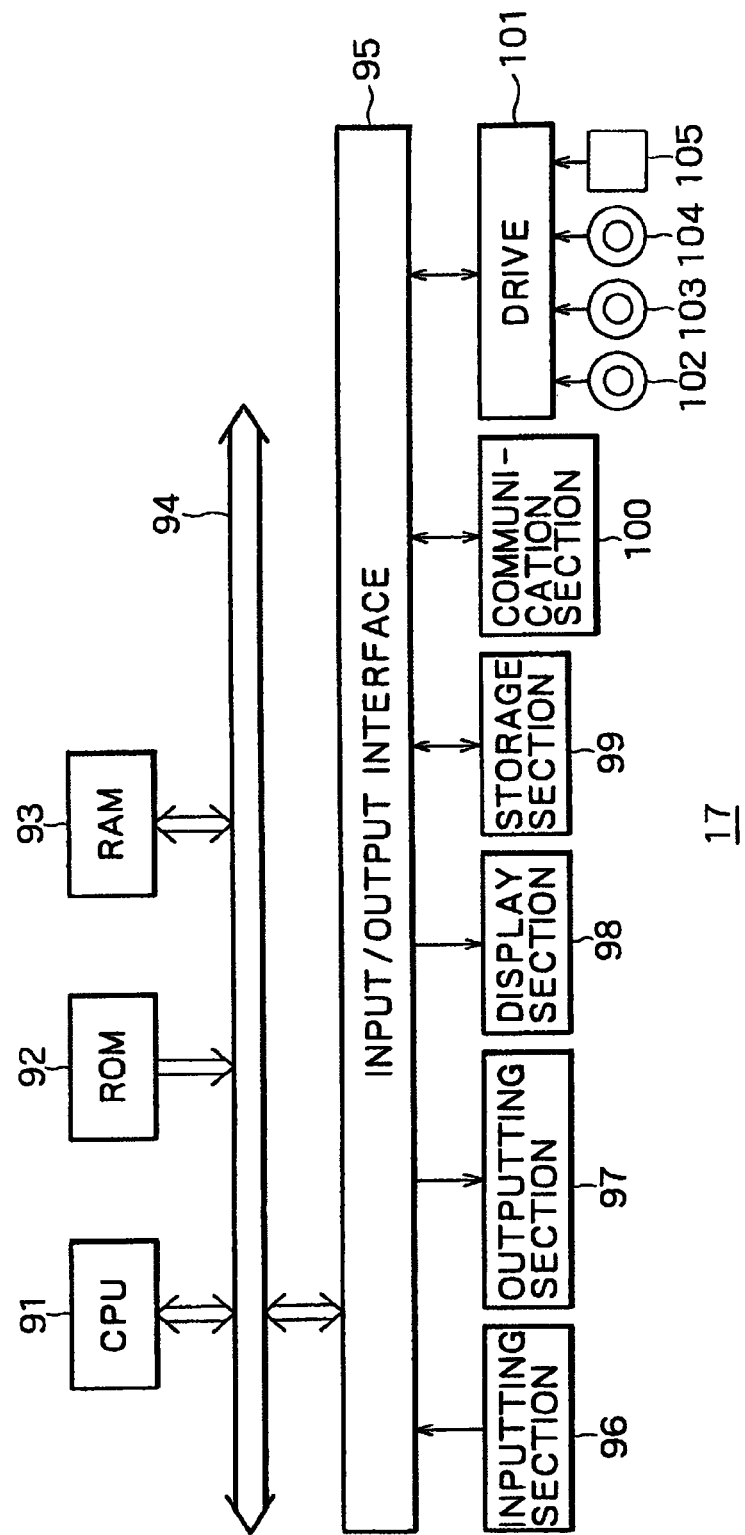
FIG. 7 is a block diagram showing an example of a configuration of a personal computer shown in FIG. 1.

FIG. 7 shows an example of a configuration of the personal computer 17.

A CPU 91 controls operation of the entire personal computer 17. A ROM 92 and a RAM 93 are connected to the CPU 91 by a bus 94. Programs and fixed data necessary for control processing to be executed by the CPU 91 are stored in the ROM 92. Meanwhile, various data including working data necessary for processing of the CPU 91 are stored into the RAM 93.

An input/output interface 95 is connected to the CPU 91 by the bus 94, and various processing blocks are connected to the CPU 91 through the input/output interface 95.

An inputting section 96 is formed from an input device such as a keyboard and/or a mouse, and various instructions are inputted to the input section 96 by the user of the personal computer 17.

An outputting section 97 and a display section 98 are formed from a speaker, an LCD unit, a CRT and so forth, and the result of processing by the CPU 91 and so forth are output (displayed) by the outputting section 97 and the display section 98.

A storage section 99 includes a hard disk, and various kinds of information and programs managed by the user of the personal computer 17 are stored in the storage section 99.

A communication section 100 communicates with various terminals through the network 9.

A drive 101 is connected to the input/output interface 95. The drive 101 is used to read or write data from or onto such recording media as a magnetic disk 102 (including a floppy disk), an optical disk 103 (including a CD-ROM (Compact Disk-Read Only Memory) and a DVD (Digital Versatile Disk)), a magneto-optical disk 104 (including an MD (Mini-Disc)), or a semiconductor memory 105.

Figure 8:
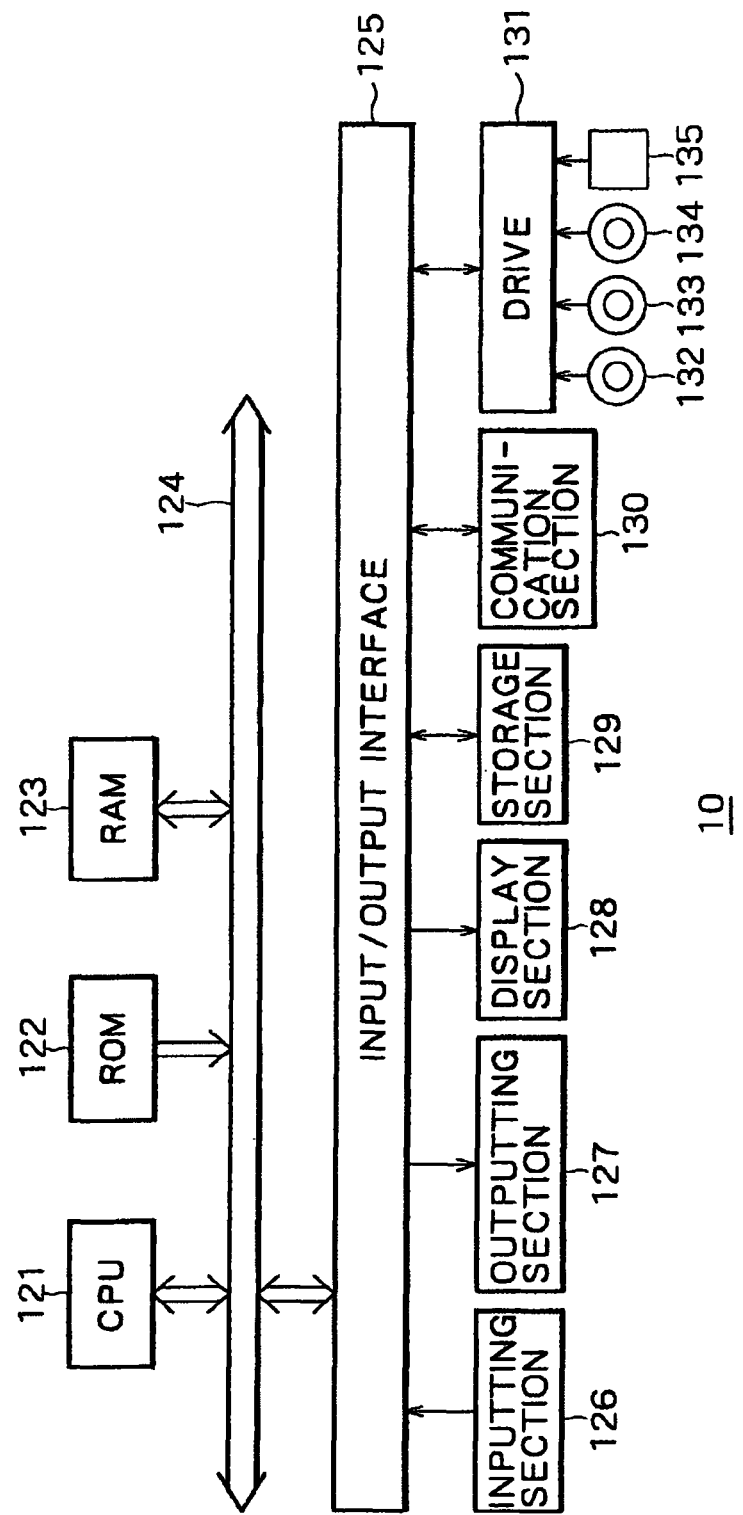
FIG. 8 is a block diagram showing an example of a configuration of a management server shown in FIG. 1.

FIG. 8 shows an example of a configuration of the management server 10. A description of those elements which have functions similar to those of the personal computer 17 is omitted herein.

A CPU 121 controls operation of the entire management server 10. A ROM 122 and a RAM 123 are connected to the CPU 121 by a bus 124, and programs necessary for control processing to be executed by the CPU 121, fixed data, a conversion program for converting data to be transmitted from the hard disk recorder 3 to the mobile phone 14 or the personal computer 17 into data which can be displayed by the mobile phone 14 or the personal computer 17, and other necessary programs are stored in a storage section 129. Various data including working data necessary for processing of the CPU 121 are stored into the RAM 123.

Also various kinds of information managed by the management server 10 such as, for example, view information of television programs enjoyed by users and registration information of the hard disk recorder 3 are stored in the storage section 129.

Now, a series of processes when the user remotely controls the hard disk recorder 3 from its terminal to execute unattended recording in response to a notification of insufficient capacity from the hard disk recorder 3 is described with reference to FIGS. 9 to 14. It is assumed here that the terminal which is used by the user to confirm a notification from the hard disk recorder 3 is the mobile phone 14.

Figure 9:
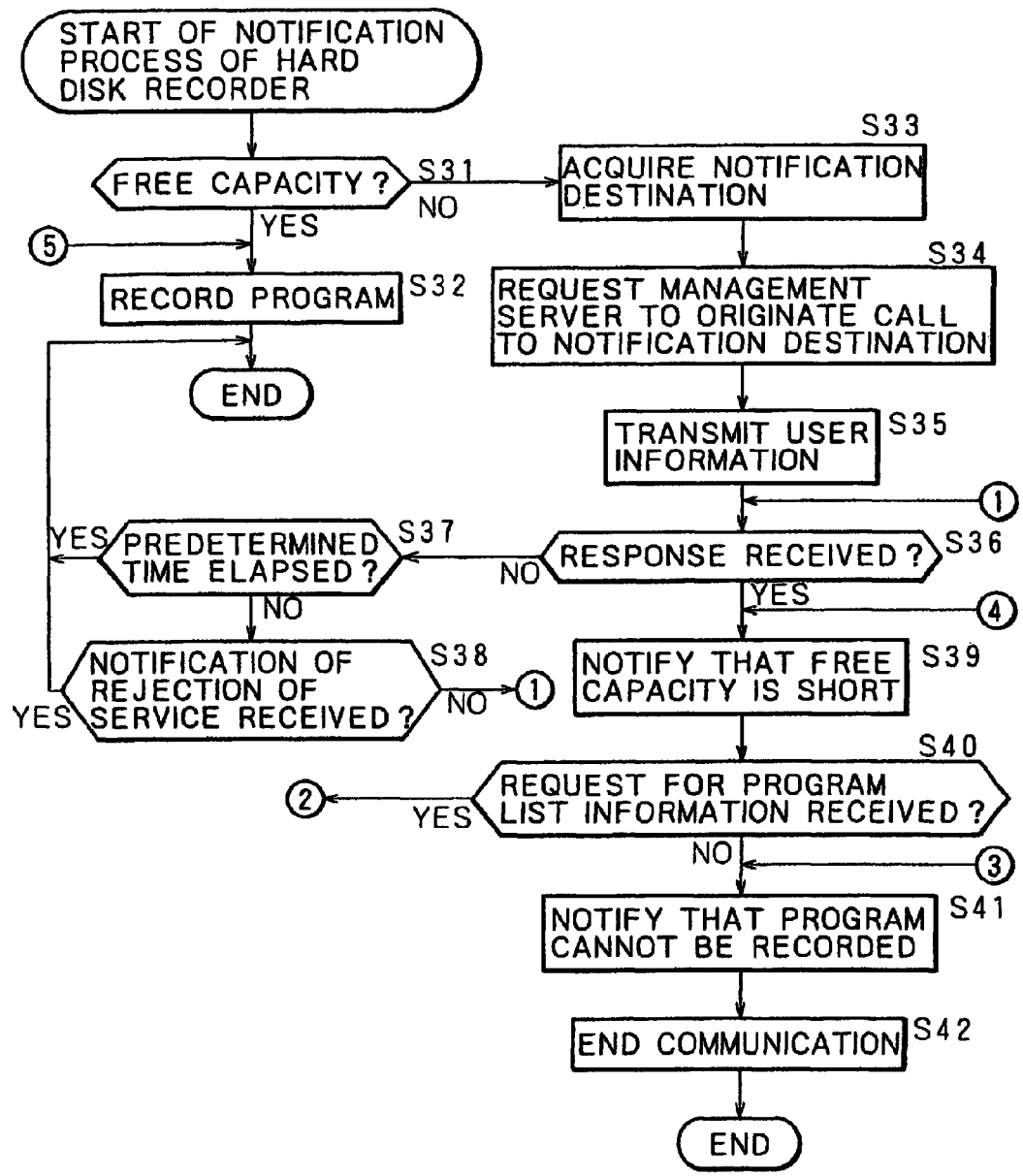
FIGS. 9 and 10 are flowcharts illustrating a notification process of the hard disk recorder.
Figure 10:
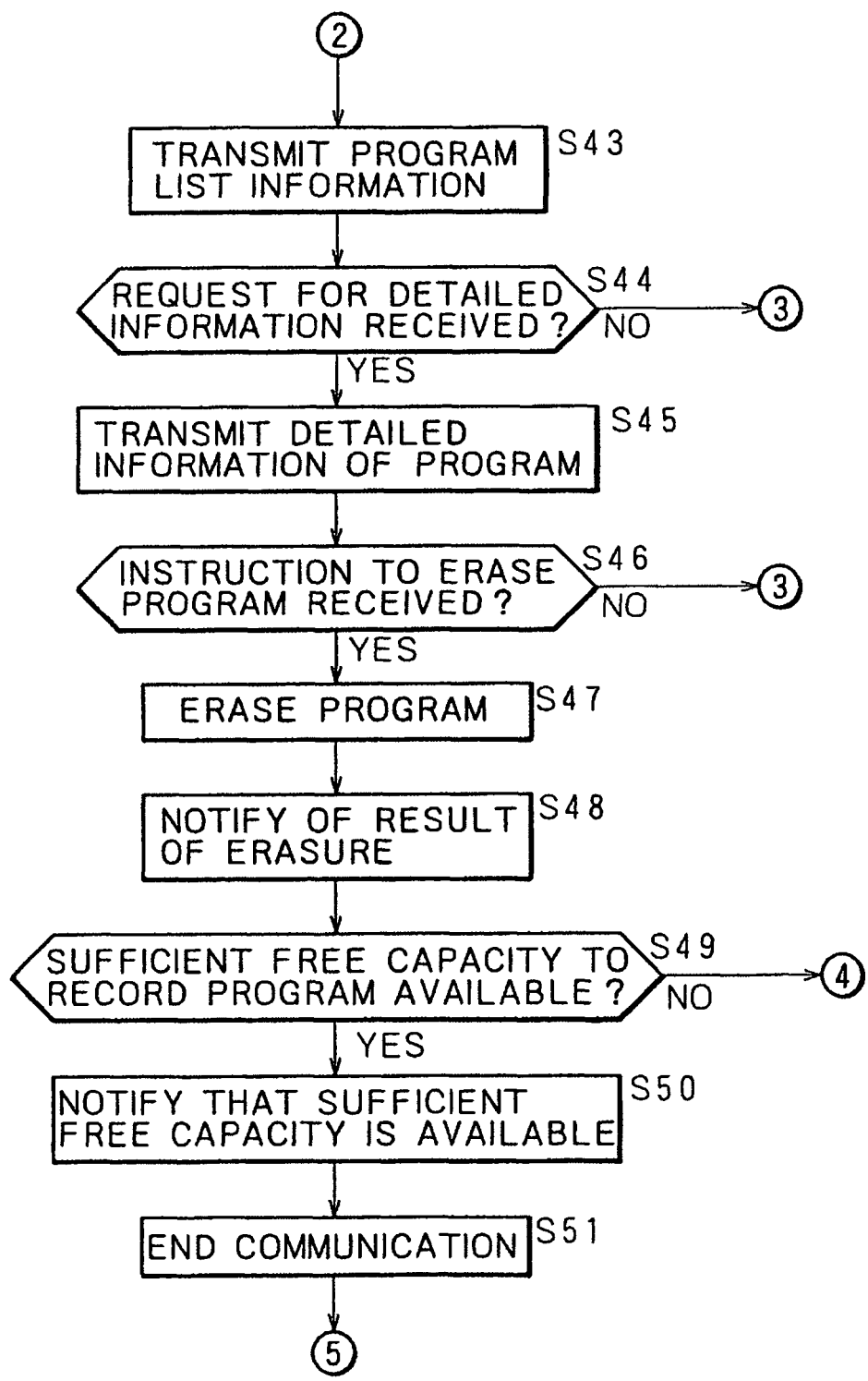

First, a notification process of the hard disk recorder 3 is described with reference to FIGS. 9 and 10. This process is started before the hard disk recorder 3 executes unattended recording. It is assumed that the user has set the hard disk recorder 3 so that, for example, all programs which belong to the genre of sports may be recorded. Accordingly, the CPU 39 receives an EPG (Electrical Program Guide) broadcast from the broadcasting business unit 1 and stores the EPG in the flash memory 44. The CPU 39 searches for a program whose genre is defined as sports in accordance with the EPG, and when the broadcast time of the program arrives, it executes a process of automatically receiving the program and recording it onto the hard disk 43. As a result, the free capacity of the hard disk 43 varies momentarily.

In step S31, the CPU 39 recognizes the data amount of the sport program whose recording is to be started (or whose recording has been started) based on the EPG broadcast from the broadcasting business unit 1, and determines whether a free capacity sufficient to record the sport program remains on the hard disk 43.

If the CPU 39 determines in step S31 that a free capacity sufficient to record the sport program remains on the hard disk 43, then the process advances to step S32.

In step S32, the CPU 39 starts recording the program when the broadcast time of the program arrives. In particular, the CPU 39 controls the tuner 31 to select a transmission channel including the program. An output of the tuner 31 is demodulated by the digital demodulation circuit 32 and is then subject to error correction by the error correction circuit 33, whereafter it is input to the demultiplexer 34, by which a TS packet of the program (data regarding the sport program) is extracted. The CPU 39 deciphers the TS packet, which is in a form encrypted with a primary key, making use of a cipher key (primary key) supplied thereto from the IC card 42, and records the deciphered TS packet on the hard disk 43. Where the data of the TS packet is in a form encrypted (scrambled) with a secondary key, the data is recorded as it is without being deciphered (descrambled).

On the other hand, if the CPU 39 determines in step S31 that the hard disk 43 does not have sufficient free capacity to record the sport program, then the process advances to step S33.

In step S33, the CPU 39 acquires from the flash memory 44 terminal information to which a notification is to be sent when the free capacity of the hard disk 43 is insufficient. Where the user sets, for example, the mobile phone 14 as the notification destination, the CPU 39 acquires a telephone number or an electronic mail address of the mobile phone 14. On the other hand, if the user sets the personal computer 17 as the notification destination, then the CPU 39 acquires an electronic mail address of the personal computer 17. In other words, the user must store terminal information for reception of a notification in the flash memory 44 or the like in advance.

In step S34, the CPU 39 controls the communication section 40 to request the management server 10 to originate a call to the notification destination acquired in step S33, i.e., the mobile phone 14. In response to the request, the management server 10 issues a request to transfer user information to the hard disk recorder 3.

Then in step S35, the CPU 39 transfers user information such as an ID, a password and so forth of the user stored in the flash memory 44.

In step S36, the CPU 39 determines whether a notification that the mobile phone 14 has responded is received from the management server 10. If the user of the mobile phone 14 cannot respond to the call originated from the hard disk recorder 3 or if the user information is not correct, then a notification that the provision of service should be rejected is transmitted from the management server 10 to the hard disk recorder 3. Therefore, the CPU 39 determines that a notification that the mobile phone 14 has responded is not received, and the process advances to step S37.

In step S37, the CPU 39 determines whether a predetermined time has elapsed after starting the call origination process to the mobile phone 14. If the CPU 39 determines that the predetermined time has elapsed, then it recognizes that the program cannot be recorded because of insufficient capacity, and ends the process.

If the CPU 39 determines in step S37 that the predetermined time has not elapsed, then the process advances to step S38.

In step S38, the CPU 39 determines whether a notification rejecting the provision of service has been received from the management server 10. If the CPU 39 determines that no such notification has been received, then the process returns to step S36 so that the process in the steps beginning with step S36 is repeated.

On the other hand, if the user information is wrong, then since a notification rejecting the provision of service is transmitted from the management server 10 to the hard disk recorder 3, the processing of the CPU 39 is ended.

If the CPU 39 determines in step S36 that the mobile phone 14 has responded, then the process advances to step S39.

In step S39, the CPU 39 controls the communication section 40 to notify the management server 10 of a message indicating that unattended recording cannot be executed because there is insufficient free capacity in the hard disk 43. The management server 10 converts the message transmitted thereto from the hard disk recorder 3 into data of a format which can be output from the mobile phone 14, and transmits the resulting data to the mobile phone 14.

Figure 13:
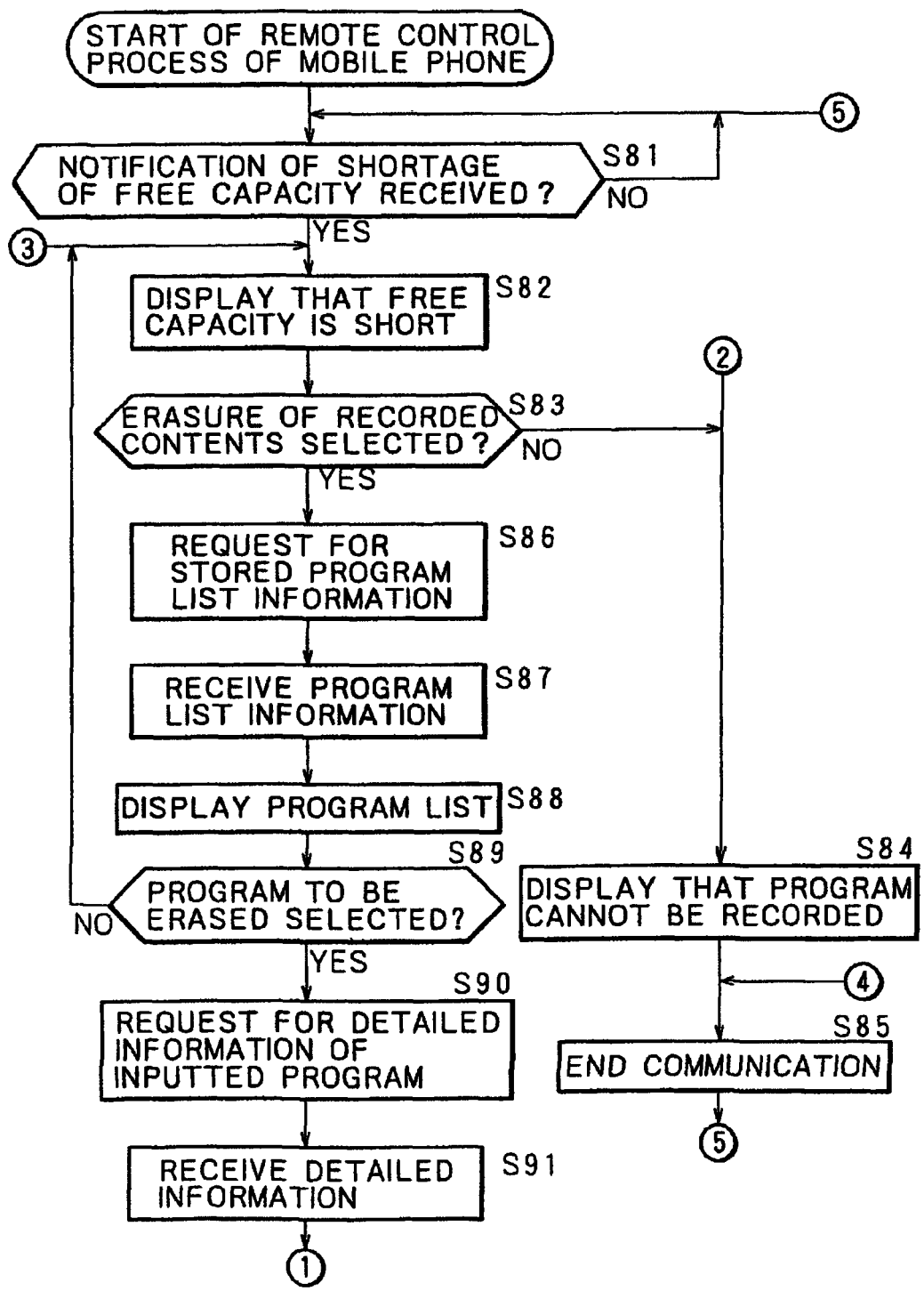
FIGS. 13 and 14 are flowcharts illustrating a control process of the mobile phone.

The user will confirm the message transmitted from the hard disk recorder 3 in step S39 on the mobile phone 14 and decide whether some program data recorded on the hard disk 43 should be erased to execute unattended recording (step S83 of FIG. 13 which is hereinafter described). If the user decides to erase some program data recorded on the hard disk 43, then the user requests the hard disk recorder 3 for list information of the program data recorded on the hard disk 43 (step S86 of FIG. 13).

In step S40, the CPU 39 determines whether a request for list information of the program data recorded on the hard disk 43 has been received from the mobile phone 14.

If the CPU 39 determines in step S40 that a request for list information of the program data recorded on the hard disk 43 has not been received from the mobile phone 14, then it recognizes that there is no need to execute unattended recording and advances the process to step S41.

In step S41, the CPU 39 controls the communication section 40 to transmit to the mobile phone 14 a message indicating that the program cannot be recorded.

Thereafter, the process advances to step S42, in which the CPU 39 ends the communication with the mobile phone 14. Then, the CPU 39 ends the processing.

On the other hand, if the CPU 39 determines in step S40 that a request for list information of the program data recorded on the hard disk 43 has been received from the mobile phone 14, then the process advances to step S43.

In step S43, the CPU 39 acquires list information of the recorded program data from the hard disk 43 and transmits the list information. The list information transmitted from the communication section 40 is converted into data of a format which can be output from the mobile phone 14 by the management server 10 similarly to the message transmitted by the process in step S39, and then the data of the format is transmitted to the mobile phone 14.

The user will confirm the list information of the program data transmitted from the hard disk recorder 3 in step S43 on the display section 79 of the mobile phone 14 and select a program to be erased from within the list information. If the user selects a program to be erased, then a request for detailed information of the program to be erased is transmitted from the mobile phone 14 (step S90 of FIG. 13).

In step S44, the CPU 39 determines whether a request for detailed information of the program to be erased has been received from the mobile phone 14. If the CPU 39 determines that a request for detailed information has not been received from the mobile phone 14, then the process advances to step S41 so that the process in the steps beginning with step S41 is executed. In other words, in this instance, recording processing is not performed.

If the CPU 39 determines in step S44 that a request for detailed information of the program to be erased has been received from the mobile phone 14, then the process advances to step S45.

In step S45, the CPU 39 reads out, from the flash memory 44, detailed information of the program designated by the request from the mobile phone 14 and transmits the detailed information from the communication section 40.

Figure 14:
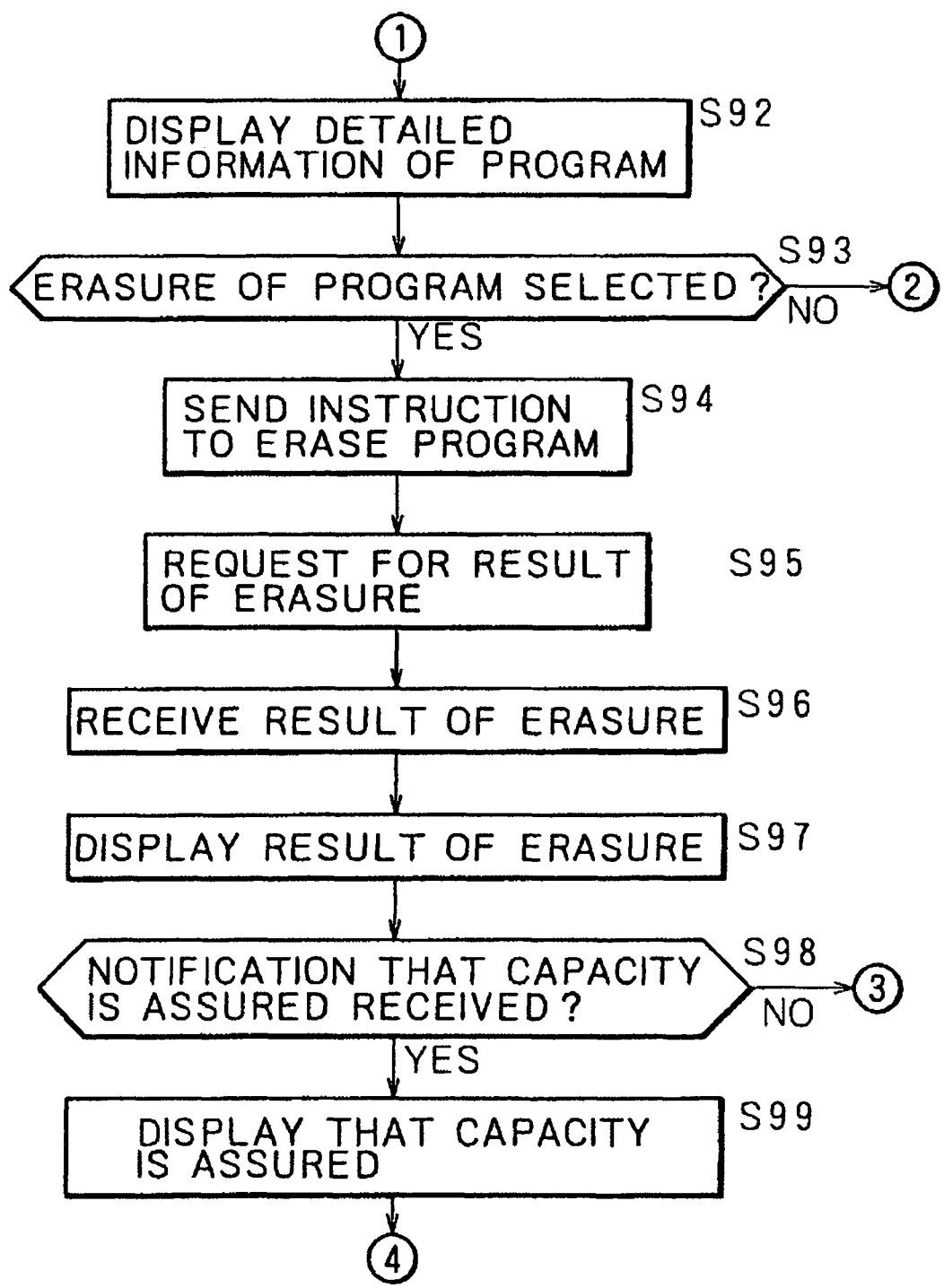

The user will confirm the detailed information transmitted from the hard disk recorder 3 in step S45 on the mobile phone 14 and decide if an instruction to erase the confirmed program should be issued to the hard disk recorder 3 (step S93 of FIG. 14).

Then in step S46, the CPU 39 determines whether an instruction to erase the program designated by the notification in step S43 has been received from the mobile phone 14. If the CPU 39 determines that an instruction to erase the program data has not been received from the mobile phone 14, then the process advances to step S41 so that the process in the steps beginning with step S41 is executed. In other words, also in this instance, recording processing is not performed.

If the CPU 39 determines in step S46 that an instruction to erase the program data has been received, then the process advances to step S47.

In step S47, the CPU 39 controls the hard disk 43 to erase the program data in accordance with the instruction from the mobile phone 14.

Then in step S48, the CPU 39 issues to the mobile phone 14 a notification that the program data has been erased in accordance with the instruction.

Then in step S49, the CPU 39 determines whether the hard disk 43 has a sufficient free capacity to record the sport program as a result of the erasure of the data in step S47. If the CPU 39 determines that the free capacity of the hard disk 43 is still insufficient, then the process returns to step S39 so that the process in the steps beginning with step S39 is executed repetitively.

If the CPU 39 determines in step S49 that a free capacity of the hard disk 43 sufficient to record the sport program is available, then the process advances to step S50.

In step S50, the CPU 39 issues to the mobile phone 14 a notification that a sufficient free capacity of the hard disk 43 is available. Thereafter, in step S32, the CPU 39 starts recording of the sport program set by the user.

Figure 11:
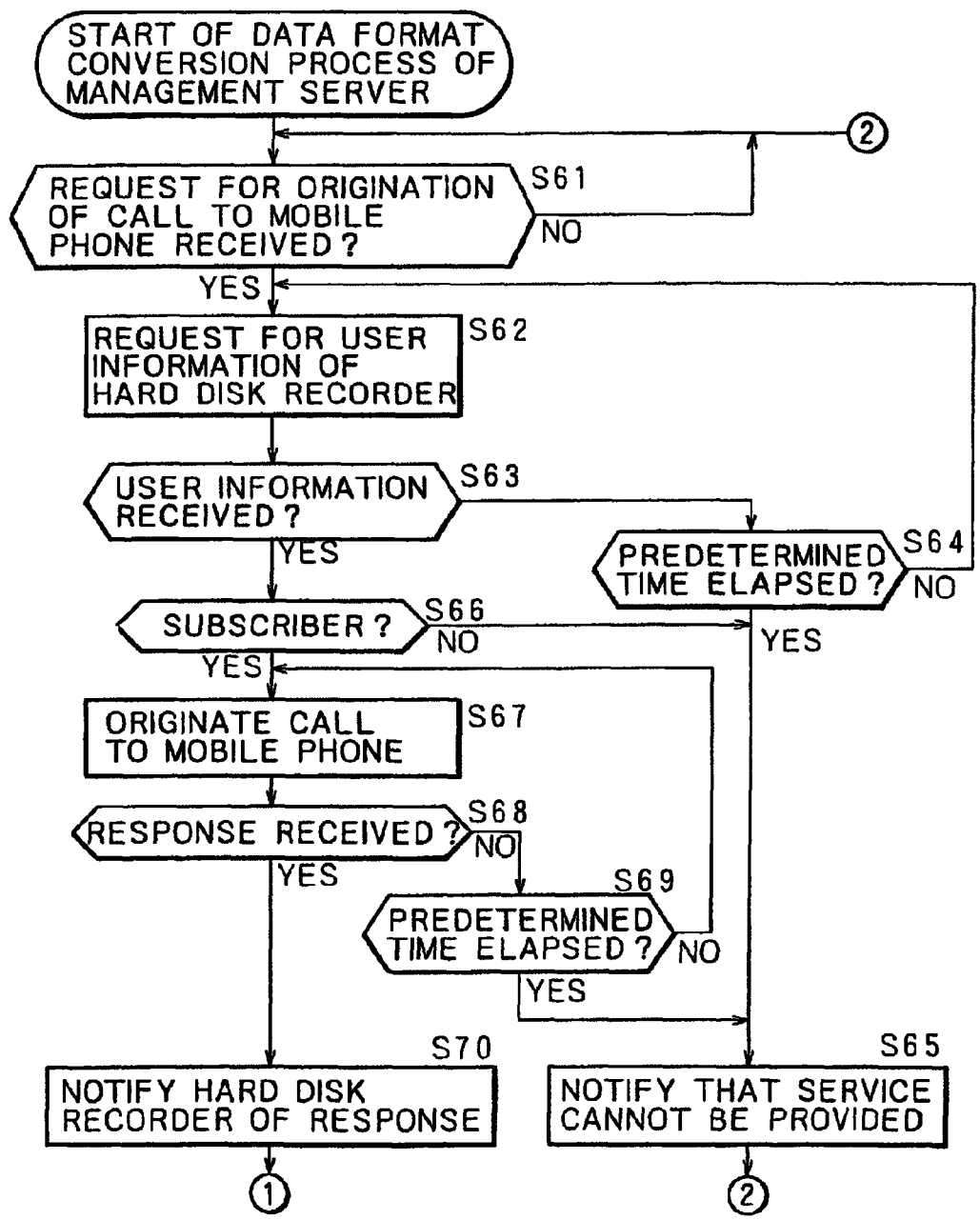
FIGS. 11 and 12 are flowcharts illustrating a transfer process of the management server.
Figure 12:
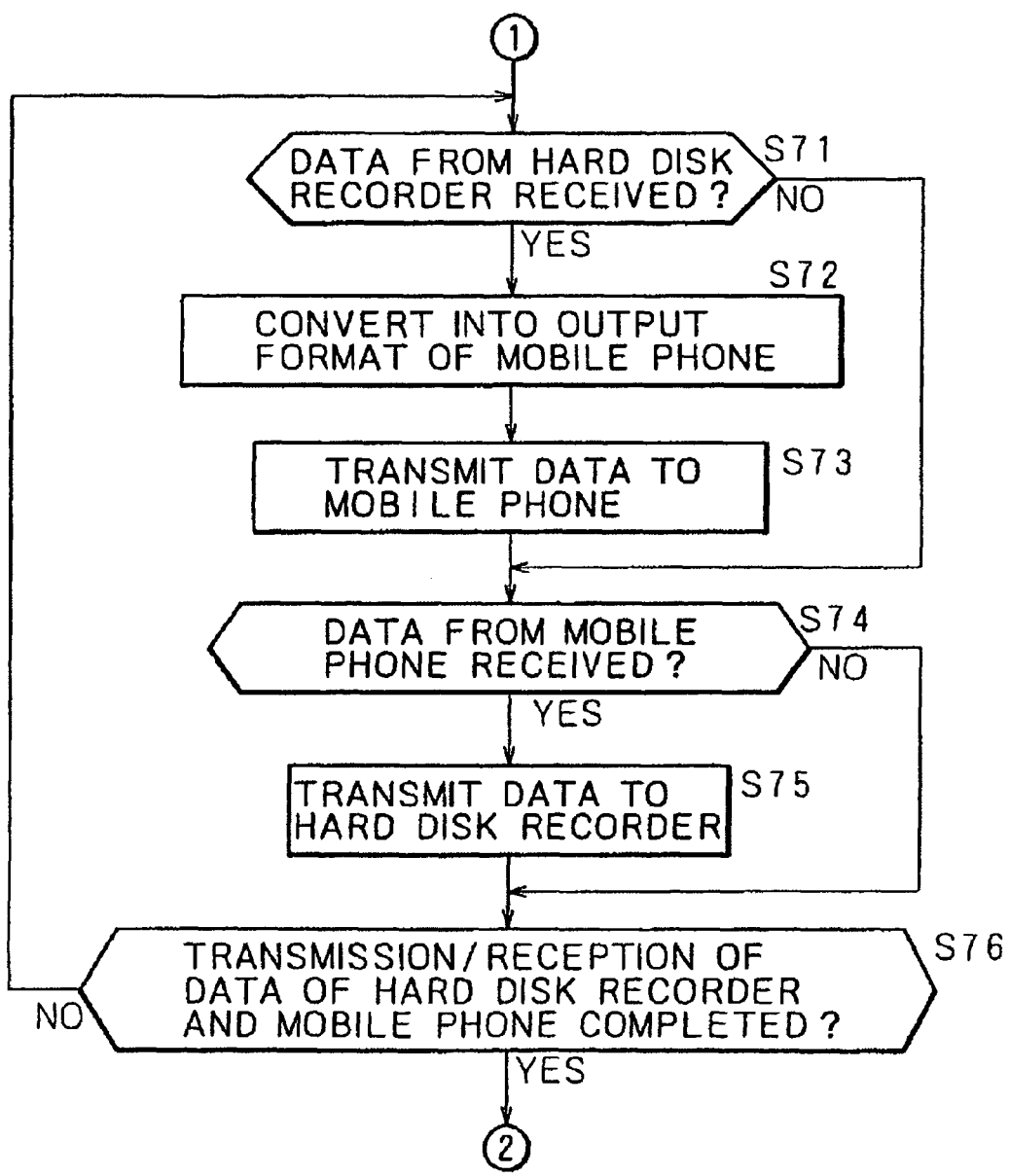

Subsequently, the processing of the management server 10 when it receives a notification of insufficient capacity from the hard disk recorder 3 is described with reference to FIGS. 11 and 12. It is to be noted that the notification of insufficient capacity is received from the mobile phone 14.

In step S61, the CPU 121 determines whether a request to originate a call to the mobile phone 14 has been received from the hard disk recorder 3. The CPU 121 waits until a request for call origination has been issued from the hard disk recorder 3, and if it determines that a request for call origination has been received, then the process advances to step S62.

In step S62, the CPU 121 issues a request for user information to the hard disk recorder 3. The CPU 121 determines based on the acquired user information whether the user of the hard disk recorder 3 is a subscriber of the recording management service. In other words, the user of the hard disk recorder 3 must conclude a contract for the recording management service with a manager of the management server 10 in advance.

In step S63, the CPU 121 determines whether user information has been transmitted from the hard disk recorder 3. If the CPU 121 determines that user information has not been transmitted thereto, then the process advances to step S64.

In step S64, the CPU 121 determines whether a predetermined time has elapsed after the issuance of the request for user information to the hard disk recorder 3. If the CPU 121 determines that the predetermined time has not elapsed, then the process returns to step S62 so that the request for user information is repeated.

If the CPU 121 determines in step S64 that the predetermined time has elapsed after the issuance of the request for user information to the hard disk recorder 3, then the process advances to step S65.

In step S65, the CPU 121 issues from the communication section 130 to the hard disk recorder 3 a notification of a message indicating that service cannot be provided because user information cannot be acquired and therefore it cannot be determined whether the user is a subscriber of the recording management service. Thereafter, the process advances to step S61.

On the other hand, if it is determined in step S63 that user information transmitted from the hard disk recorder 3 has been received by the communication section 130, then the process advances to step S66.

In step S66, the CPU 121 searches the registered information stored in the storage section 129 based on the user information transmitted from the hard disk recorder 3 to determine whether the user of the hard disk recorder 3 is a subscriber of the recording management service. If the CPU 121 determines that the user of the hard disk recorder 3 is not a subscriber of the recording management service, then the process advances to step S65 so that the process in the steps beginning with step S65 is executed.

If the CPU 121 determines in step S66 that the user of the hard disk recorder 3 is a subscriber of the recording management service, then the process advances to step S67.

In step S67, the CPU 121 originates a call to the mobile phone 14 in order to start communication with the mobile phone 14.

Then in step S68, the CPU 121 determines whether a response from the user of the mobile phone 14 has been received. If the CPU 121 determines that no response has been received from the user of the mobile phone 14, then the process advances to step S69.

In step S69, the CPU 121 determines whether a predetermined time has elapsed after the origination of a call to the mobile phone 14. If the CPU 121 determines that the predetermined time has not elapsed, then the process returns to step S67 so that the call origination to the mobile phone 14 is repeated.

If the CPU 121 determines in step S69 that the predetermined time has elapsed after the origination of a call to the mobile phone 14, then the process advances to step S65, in which the CPU 121 issues to the hard disk recorder 3 a notification that service cannot be provided.

On the other, if the CPU 121 determines in step S68 that a response has been received as a result of operation of a button of the inputting section 77 by the user of the mobile phone 14, then the process advances to step S70.

In step S70, the CPU 121 issues to the hard disk recorder 3 a notification that a response has been received from the mobile phone 14.

Then in step S71, the CPU 121 determines whether data transmitted from the hard disk recorder 3 to the mobile phone 14 has been received by the communication section 130. If the CPU 121 determines that data transmitted from the hard disk recorder 3 to the mobile phone 14 has been received, then the process advances to step S72.

In step S72, the CPU 121 applies the conversion program stored in the storage section 129 for the received data to convert the data into data of a format which can be displayed by the display section 79 of the mobile phone 14.

Then in step S73, the CPU 121 transmits the converted data from the communication section 130 to the mobile phone 14.

On the other hand, if the CPU 121 determines in step S71 that data from the hard disk recorder 3 has not been received, then the process advances to step S74, skipping steps S72 and S73.

The CPU 121 determines in step S74 whether data transmitted from the mobile phone 14 to the hard disk recorder 3 has been received by the communication section 130. If the CPU 121 determines that data from the mobile phone 14 has been received, then the process advances to step S75.

In step S75, the CPU 121 transmits the data received from the mobile phone 14 by the communication section 130 to the hard disk recorder 3 without converting the data format of the data.

On the other hand, if the CPU 121 determines in step S74 that data transmitted from the mobile phone 14 to the hard disk recorder 3 has not been received, then the process advances to step S76, skipping step S75.

In step S76, the CPU 121 determines whether transmission/reception of data of the hard disk recorder 3 and the mobile phone 14 has been completed. If the CPU 121 determines that transmission/reception of data has not been completed as yet, then the process returns to step S71 so that the process in the steps beginning with step S71 is executed repetitively.

If the CPU 121 determines in step S76 that transmission/reception of data of the hard disk recorder 3 and the mobile phone 14 has been completed, then the process returns to step S61.

Now, a control process of the mobile phone 14 which remotely controls the hard disk recorder 3 is described with reference to FIGS. 13 and 14.

In step S81, the CPU 71 determines whether a message indicating that the free capacity of the hard disk 43 is insufficient has been received from the hard disk recorder 3. The CPU 71 waits until a message is received by the communication section 76, and if it determines that a message has been received, then the process advances to step S82.

In step S82, the CPU 71 controls the display section 79 to display the message received by the communication section 76 to notify the user of the message.

FIG. 15A shows an example of the message that the CPU 71 controls the display section 79 to display by the process in step S82. On the display section 79, "The free capacity is short. Should a recorded program be erased? YES NO" is displayed to urge the user to select whether a program recorded already on the hard disk 43 should be erased. It is to be noted that the display is given together with a ringing tone from a ringing tone outputting section (not shown).

Then in step S83, the CPU 71 determines whether the user has chosen to erase recorded contents of the hard disk 43 in response to the message displayed on the display section 79 in step S82 (i.e., whether the "YES" button has been selected). If the CPU 71 determines that the user has not chosen to erase recorded contents (i.e., if the user has decided that there is no need to execute unattended recording), then the process advances to step S84.

In step S84, the CPU 71 receives a notification transmitted from the hard disk recorder 3 (step S39 of FIG. 9) and controls the display section 79 to display a message indicating that the program cannot be recorded.

FIG. 15B shows an example of the message that the CPU 71 controls the display section 79 to display by the process in step S84. In the example shown in FIG. 15B, "The program cannot be recorded because the free capacity is short." is displayed.

In step S85, the CPU 71 ends the communication with the hard disk recorder 3. Thereafter, the process returns to step S81.

On the other hand, if the CPU 71 determines in step S83 based on information input from the inputting section 77 that the user has chosen to erase recorded contents of the hard disk 43 (i.e., if it is determined that unattended recording should be executed), then the process advances to step S86.

In step S86, the CPU 71 issues to the hard disk recorder 3 a request for transmission of list information for the program data recorded on the hard disk 43.

List information transmitted from the hard disk recorder 3 (step S43 of FIG. 10) is received by the communication section 76 through the communication antenna 15 in step S87.

Then in step S88, the CPU 71 controls the display section 79 to display the list information received by the communication section 76 by the process in step S87.

FIG. 15C shows an example of the message that the CPU 71 controls the display section 79 to display by the process in step S88. In the present example, a message of "Which program should be erased?" is displayed, and messages of "News/weather forecast CH1 9:00" and "Wide show CH8 15:00" are displayed in a list as programs recorded already on the hard disk 43. "News/weather forecast" and "Wide show" represent the program titles, and the "CH1" and the "CH8" represent broadcast channels, while "9:00" and "15:00" represent broadcast hours. Further, a "Return" button is displayed on the display section 79. The user can operate the inputting section 77 to select the "Return" button to restore the selection screen of FIG. 15A.

In step S89, the CPU 71 determines whether a program to be erased has been selected by the user in response to the message displayed by the process in step S88. In particular, in the case of the display example of FIG. 15C, the CPU 71 determines whether one (or both) of the program data of the "News/weather forecast" and the "Wide show" has been selected. If the CPU 71 determines that a program to be erased has not been input from the inputting section 77 (when it determines that "Return" has been selected), then the process returns to step S82 so that the process in the steps beginning with step S82 is repetitively executed.

If the CPU 71 determines in step S89 that a program to be erased has been selected by the user, then the process advances to step S90.

In step S90, the CPU 71 issues to the hard disk recorder 3 a request for transmission of detailed information of the program selected to be erased by the user. In the following, processing is described for the case where the user selects the "News/weather forecast" as a program to be erased.

In step S91, detailed information of the program transmitted from the hard disk recorder 3 is received by the communication section 76 through the communication antenna 15.

Referring now to FIG. 14, in step S92, the CPU 71 controls the display section 79 to display the detailed information received by the communication section 76 in step S91.

FIG. 15D illustrates an example of a message that the CPU 71 controls the display section 79 to display by the process in step S92. In the example shown, a message of "Should this program be erased?" is displayed, and in addition to the program titles, broadcast channels and broadcast hours described above, "Jun. 30, 2000" representative of the date of the recording and "30 minutes" representative of the length of the recording are displayed. Furthermore, "Yes" and "No" buttons are displayed on the display section 79 so that the user can operate the inputting section 77 to select whether erasure should be performed.

In step S93, the CPU 71 determines whether a selection has been made to erase the program whose detailed information was displayed by the process in step S92. If the CPU 71 determines that the user has chosen not to erase the program (i.e., if the CPU 71 determines that the "No" button has been selected on the display screen of FIG. 15D), then the process advances to step S84 so that the process in the steps beginning with step S84 is executed.

If the CPU 71 determines in step S93 that the user has chosen to erase the program whose detailed information was displayed by the process in step S92 (i.e., if it is determined that the "Yes" button has been selected on the display screen of FIG. 15D), then the process advances to step S94.

In step S94, the CPU 71 issues to the hard disk recorder 3 an instruction to erase the program displayed by the process in step S92.

Then in step S95, the CPU 71 issues a request for transmission of a result of the erasure to the hard disk recorder 3 in order to confirm whether the program which the CPU 71 instructed to erase has been erased.

Then in step S96, the CPU 71 receives, by means of the communication section 76 thereof, a message of the result of the erasure transmitted from the hard disk recorder 3 in response to the process in step S95.

Then in step S97, the CPU 71 controls the display section 79 to display the message of the result of the erasure received by the communication section 76 by the process in step S96.

FIG. 15E illustrates an example of the message that the CPU 71 controls the display section 79 to display by the process in step S97. In the present example, a message of "The news/weather forecast has been erased." is displayed.

Then in step S98, the CPU 71 determines whether a notification that a sufficient free capacity of the hard disk 43 has been assured successfully has been received from the hard disk recorder 3 by the communication section 76. If the CPU 71 determines that a notification indicating that a sufficient free capacity has been assured successfully has not been received, then the CPU 71 recognizes that the free capacity of the hard disk 43 is still insufficient. Thereafter, the process returns to step S82 so that the process in the steps beginning with step S82 is executed repetitively.

On the other hand, if the CPU 71 determines in step S98 that a notification indicating that a sufficient free capacity of the hard disk 43 has been assured successfully has been received from the hard disk recorder 3 by the communication section 76, then the process advances to step S99.

In step S99, the CPU 71 controls the display section 79 to display the notification received by the communication section 76 in step S98.

FIG. 15F illustrates an example of a message that the CPU 71 controls the display section 79 to display by the process in step S99. In the present example, a message of "The capacity is assured" is displayed.

In the foregoing, data to be transmitted from the hard disk recorder 3 is transmitted to the mobile phone 14 after it is converted by the management server 10 into data of a data format which can be output by the mobile phone 14. However, if the hard disk recorder 3 has a built-in program which can convert the data format, then data can be transmitted directly to the mobile phone 14 from the hard disk recorder 3 without intervention of the management server 10.

Further, data to be transmitted from the hard disk recorder 3 (for example, list information of programs recorded on the hard disk 43) is transmitted after a response from the mobile phone 14 has been received. However, such data may otherwise be transmitted collectively together with a notification that the free capacity is insufficient.

Where the hard disk recorder 3 is connected to some other recording apparatus (a DVD-RAM, a personal computer or the like), the user can remotely control the hard disk recorder 3 and the recording apparatus from the mobile phone 14 to transfer program data recorded on the hard disk recorder 3 to the recording apparatus.

Subsequently, an information processing system for view information or charge information is described wherein the hard disk recorder 3 having the functions described above records a television program provided from the broadcasting business unit 1 onto the hard disk 43 and the user utilizes the television program.

FIG. 16 shows an example of a configuration of the information processing system and illustrates a relationship among the broadcasting business unit 1, hard disk recorder 3, management server 10 and charging center 11 of FIG. 1 more particularly. It is to be noted that hard disk recorders 3-1 to 3-3 have a configuration similar to that of the hard disk recorder 3.

The broadcasting business unit 1 includes a viewer management server 151, a program preparation apparatus 152, a secondary key encryption apparatus 153, a primary key encryption apparatus 154, and a transmission apparatus 155. A broadcasting antenna 2 is provided for the transmission apparatus 155.

The charging center 11 includes a cipher key management server 161 and a charging server 162.

A television broadcast wave transmitted from the broadcasting antenna 2 provided for the broadcasting business unit 1 is received by the hard disk recorders 3-1 to 3-3 through a satellite (not shown) and recorded in the hard disk 43 built in each of the hard disk recorders 3-1 to 3-3. It is to be noted that program data transmitted from the broadcasting business unit 1 are in a state encrypted only with a primary key or with both a primary key and a secondary key and are recorded in a state wherein they are decrypted only with the primary key (in a state wherein they are not in an encrypted state or in an encrypted state only with the secondary key).

If the user of the hard disk recorder 3-1 decrypts the television program using the secondary key and enjoys the television program, then view information regarding the processing by the user is stored in a storage section (not shown) of the secondary key cancellation section 49 and transmitted to the management server 10 after each predetermined interval of time. The management server 10 charges the user based on the view information (view information regarding decryption using the secondary key). Also, view information regarding processing by the user who decrypts program data with the primary key and records the program data onto the hard disk 43 or enjoys the program data directly (on a real time basis) is transmitted to the management server 10. This view information (view information regarding decryption using the primary key) is stored in a storage section (not shown) provided in the IC card 42 and transmitted to the management server 10 collectively for each predetermined period of time.

Also, view information from the hard disk recorders 3-2 and 3-3 is transmitted to the management server 10 for each predetermined period of time similarly to the information from the hard disk recorder 3-1.

The management server 10 collectively stores, for each user, view information (view information based on utilization of a primary key (the view information is hereinafter referred to as first view information) and view information based on utilization of a secondary key (the view information is hereinafter referred to as second view information)) transmitted thereto from the hard disk recorders 3-1 to 3-3. The management server 10 transmits the first view information and the card IDs of the IC cards 42 to the charging server 162 at a predetermined time (on the predetermined date or after each predetermined period).

The charging server 162 performs charging based on the first view information transmitted thereto from the management server 10 and transmits charge information and the card IDs to the viewer management server 151 of the broadcasting business unit 1. The charge information includes the charges for the programs viewed by the users of the hard disk recorders 3-1 to 3-3, the account numbers designated as a method of payment, and information of credit card numbers. Further, if the charging server 162 charges based on electronic money, then the charge information also includes value information of the electronic money and so forth.

The cipher key management server 161 produces a primary key based on the card IDs of viewer information transmitted thereto from the viewer management server 151 and provides the primary key to the primary key encryption apparatus 154. The cipher key management server 161 supplies a secondary key transferred thereto from the management server 10 to the secondary key encryption apparatus 153. The viewer information includes apparatus IDs of the hard disk recorders 3-1 to 3-3, card IDs of the IC cards 42 and so forth.

In the following, a series of processes when the user of the hard disk recorder 3-1 receives and enjoys a television broadcast wave transmitted from the broadcasting business unit 1 using the hard disk recorder 3-1 is described with reference to FIGS. 17 to 20.

Figure 17:
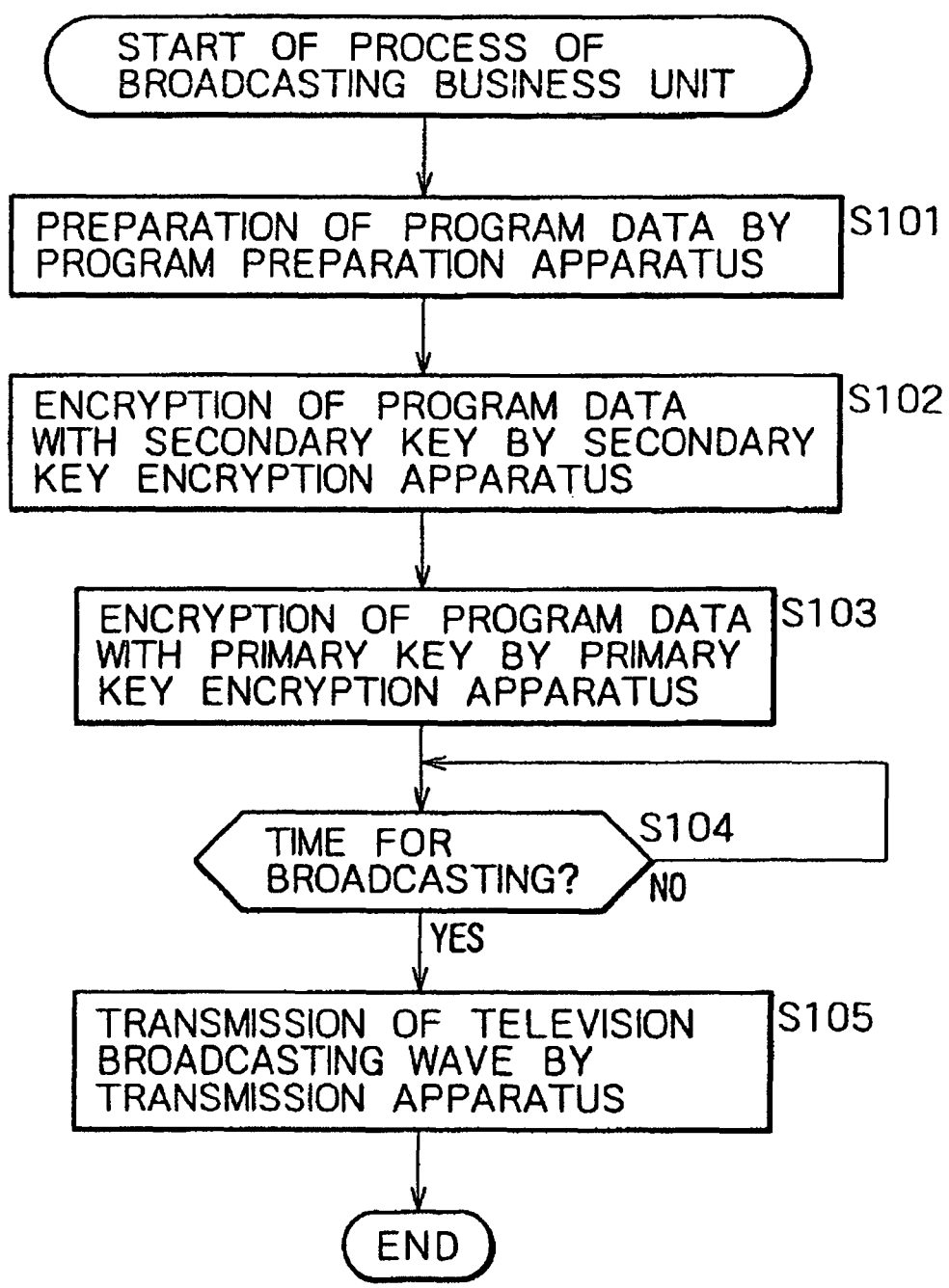
FIG. 17 is a flowchart illustrating a process of a broadcasting business unit shown in FIG. 16.

First, processing of the broadcasting business unit 1 is described with reference to FIG. 17.

In step S101, the program preparation apparatus 152 compression codes a plurality of analog program sources acquired thereby in accordance with the MPEG 2 system. The program preparation apparatus 152 multiplexes the compression coded digital data to produce a transport stream of the MPEG 2 system.

Then in step S102, the secondary key encryption apparatus 153 encrypts the transport stream produced by the program preparation apparatus 152 in step S101 using the secondary key provided thereto from the cipher key management server 161. This encryption is performed when necessary, and a public key provided from a predetermined organization is used as the secondary key.

Then in step S103, the primary key encryption apparatus 154 further encrypts the transport stream encrypted using the secondary key by the secondary key encryption apparatus 153 in step S102 using the primary key provided from the cipher key management server 161. In order to allow the primary key encryption apparatus 154 to receive provision of the primary key from the cipher key management server 161, the viewer management server 151 transmits viewer information including the card IDs of the IC cards 42 for the hard disk recorders 3 to the cipher key management server 161. The cipher key management server 161 produces a primary key for the card IDs and transmits the primary key to the primary key encryption apparatus 154.

In step S104, the transmission apparatus 155 determines whether a predetermined broadcast time has arrived. The transmission apparatus 155 waits until the predetermined broadcast time has arrived, and when it determines that the predetermined time has arrived, the process advances to step S105.

In step S105, the transmission apparatus 155 transmits a television broadcast wave from the broadcasting antenna 2.

Figure 18:
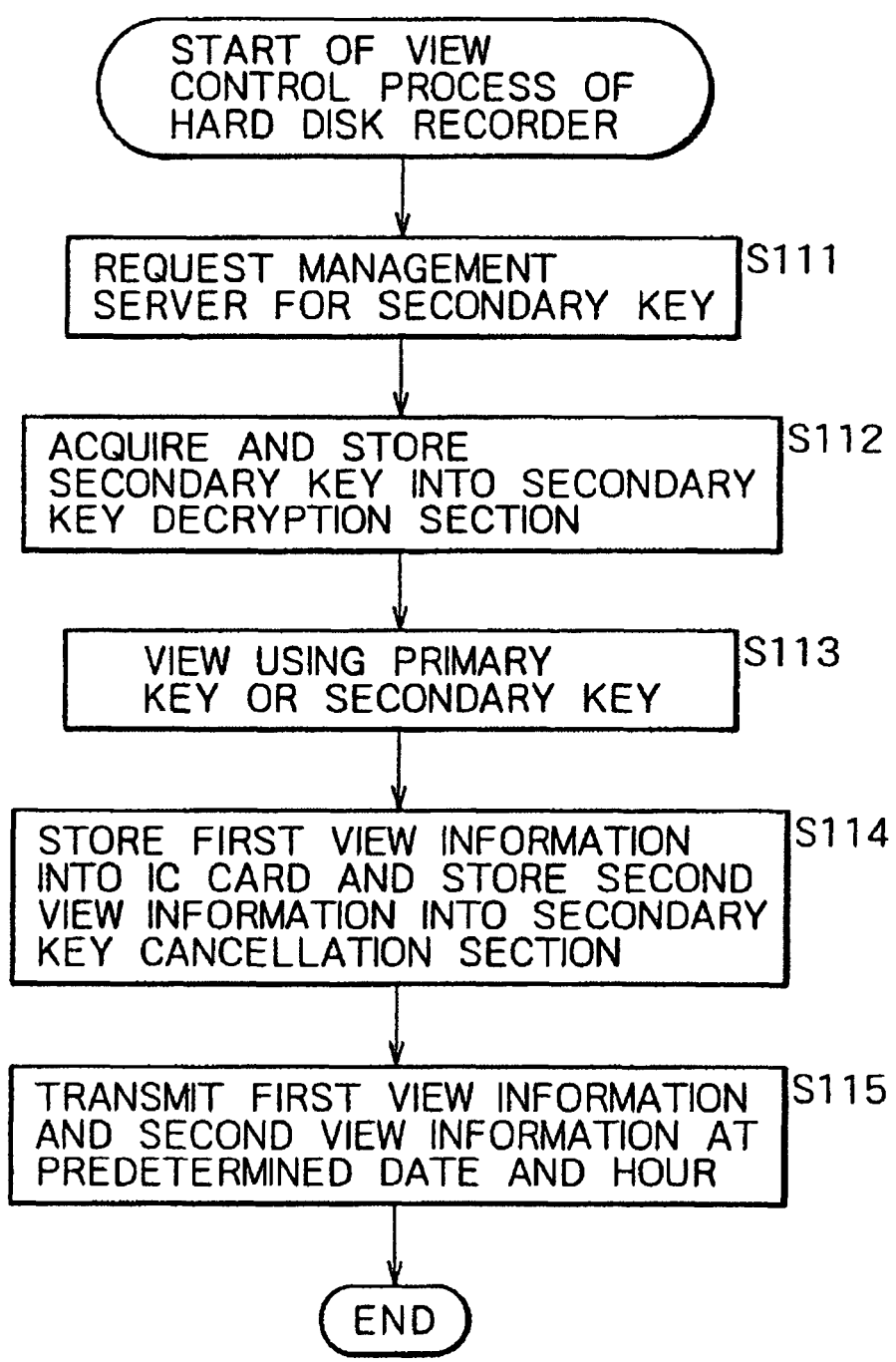
FIG. 18 is a flowchart illustrating a view control process of a hard disk recorder shown in FIG. 16.

Now, a view control process of the hard disk recorder 3-1 when it receives the television broadcast wave transmitted from the broadcasting business unit 1 is described with reference to FIG. 18. It is assumed here that the user of the hard disk recorder 3-1 enjoys the television program on a real-time basis.

In step S111, the CPU 39 issues a request for transmission of a secondary key to the management server 10 through the communication section 40 (this is limited only to the case in which it is determined that the secondary key is required in order to play back a program selected by the user). The requesting information to be transmitted from the hard disk recorder 3-1 includes, similarly to the view request information transmitted to the cipher key management server 161, the apparatus ID of the hard disk recorder 3-1 and the card ID of the IC card 42.

The management server 10 receives the secondary key requesting information from the hard disk recorder 3-1 and performs authentication of the apparatus ID or the card ID, whereafter it transmits the secondary key to the hard disk recorder 3-1. The secondary key is the same as the secondary key which has been supplied from the management server 10 to and is stored in the cipher key management server 161. The management server 10 itself produces the secondary key or acquires it from a predetermined organization. The secondary key is updated after each predetermined interval of time.

In step S112, the CPU 39 receives the secondary key transmitted thereto from the management server 10 by means of the communication section 40 and stores the secondary key in the storage section of the secondary key cancellation section 49.

Then in step S113, the CPU 39 decrypts the program data (TS packet) of the television program corresponding to the view request information using the primary key stored in advance in the IC card 42 and the secondary key stored in the secondary key cancellation section 49 to play back the program data. Upon such playback, the individual blocks perform such processes as described hereinabove.

Then in step S114, the CPU 39 stores the view information (first view information) regarding the program decrypted (descrambled) using the primary key in the storage section of the IC card 42. Further, the CPU 39 stores the view information (second view information) regarding the program decrypted (descrambled) using the secondary key in the storage section of the secondary key cancellation section 49.

Then in step S115, when the predetermined date and hour set by the management server 10 such as, for example, the last day of every month comes, the CPU 39 reads out the first view information from the storage section of the IC card 42 and reads out the secondary view information from the storage section of the secondary key cancellation section 49, and transmits the first and second view information from the communication section 40 to the management server 10 together with necessary information, such as the apparatus ID of the hard disk recorder 3-1, the card ID and so forth. Consequently, the hard disk recorder 3-1 has to perform accessing only once when compared with an alternative case wherein it transmits the first view information to the charging server 162 or the broadcasting business unit 1 and transmits the second view information to the management server 10.

Figure 19:
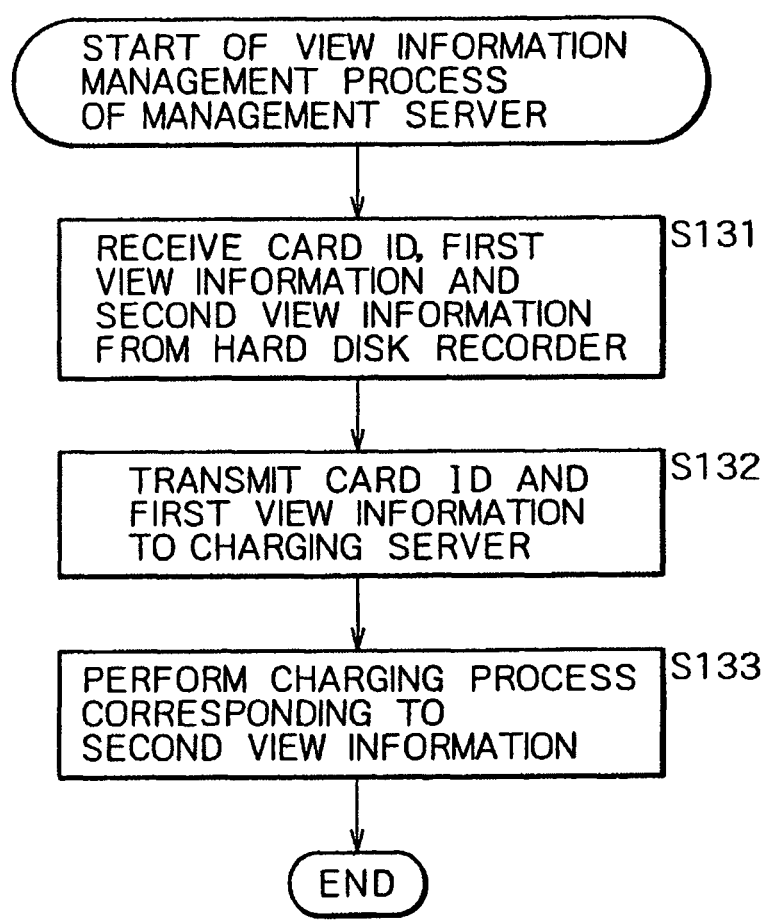
FIG. 19 is a flowchart illustrating a view information management process of a management server shown in FIG. 16.

Subsequently, a process of the management server 10 which manages first and second view information transmitted thereto from the hard disk recorders 3-1 to 3-3 is described with reference to FIG. 19. In the following description, when there is no need to distinguish the hard disk recorders 3-1 to 3-3 from one another, the hard disk recorders 3-1 to 3-3 are referred to merely as hard disk recorders 3.

In step S131, the CPU 121 receives card IDs, first view information and second view information transmitted from the hard disk recorders 3. The CPU 121 stores the card IDS in the storage section 129 and stores the first view information and the second view information separately from one another in the storage section 129.

In step S132, the CPU 121 transmits the card IDs to the charging server 162. Then, when a predetermined date and hour arrive, the CPU 121 transmits the first view information from within the view information of the hard disk recorders 3-1 to 3-3 stored in the storage section 129 collectively to the charging server 162. Consequently, the charging server 162 or the broadcasting business unit 1 need not collect such view information individually from the plurality of hard disk recorders 3-1 to 3-3. Thereafter, the charging server 162 charges the users of the hard disk recorders 3-1 to 3-3 based on the first view information, that is, information regarding programs decrypted by the hard disk recorder 3 using the primary key.

In step S133, the CPU 121 charges the users of the hard disk recorders 3-1 to 3-3 based on the second view information stored in the storage section 129, that is, the information regarding programs decrypted using the secondary key.

Figure 20:
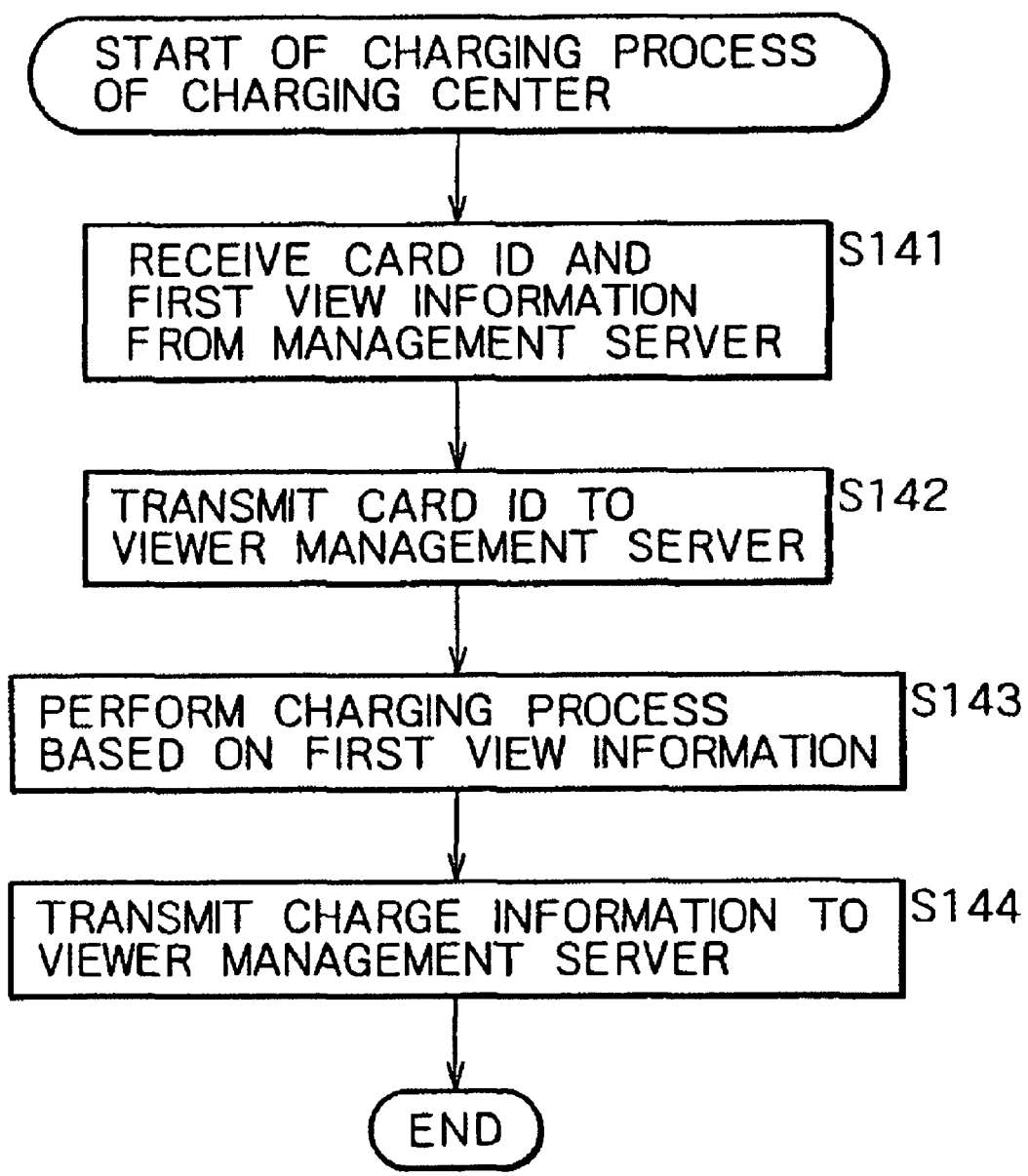
FIG. 20 is a flowchart illustrating a process of a charging server shown in FIG. 16.

Now, a charging process of the charging center 11 is described with reference to FIG. 20.

In step S141, the charging server 162 provided in the charging center 11 receives card IDs of the IC cards 42 and first view information transmitted thereto from the management server 10 on every predetermined date and hour.

In step S142, the charging server 162 transmits the card IDs to the viewer management server 151. Thereafter, the viewer management server 151 receiving the card IDs transmits the card IDs to the cipher key management server 161 so that a primary key may be provided to the primary key encryption apparatus 154.

In step S143, the charging server 162 performs a charging process based on the first view information transmitted thereto from the hard disk recorder 3.

In step S144, the charging server 162 transmits charge information obtained by the charging process in step S143 to the viewer management server 151.

The information management system described above is not limited to the form described hereinabove with reference to FIG. 16 and may be formed from various combinations. For example, the management server 10 may serve also as the charging server 162, or the broadcasting business unit 1 itself may perform a charging process or manage a cipher key or keys.

Now, processes of the hard disk recorder 3 and the management server 10 when the user first records a broadcast commodity guide program onto the hard disk recorder 3 and then plays back and views the commodity guide program at a predetermined time and then orders some commodity are described. As described hereinabove, since the management server 10 is accessed in various manners from the hard disk recorders 3, it has an access limitation function provided therefor in order to stabilize processing. It is assumed that a commodity guide program viewed by a user is recorded in a state wherein it is encrypted with a secondary key in the hard disk recorder 3.

First, an order acceptance process of the management server 10 is described with reference to FIG. 21.

In step S151, the CPU 121 recognizes, from secondary key requesting information (transmitted by the process in step S182 of FIG. 23 which is hereinafter described) from the hard disk recorder 3, that the hard disk recorder 3 plays back a commodity guide program, and transmits a secondary key corresponding to the commodity guide program.

FIG. 22A illustrates an example of a stream of a commodity guide program to be played back by the hard disk recorder 3 which has received the secondary key. The hard disk recorder 3 starts playback of a commodity guide program illustrated as stream 1 and having a playback time of 15 minutes.

In step S152, the CPU 121 determines whether the order acceptance process of the program ordered from the user of the hard disk recorder 3 has been completed. The user of the hard disk recorder 3 will input necessary information such as a necessary quantity and a method of payment based on an application screen displayed at the end of the commodity guide program to order a commodity or commodities. If the CPU 121 determines that the order acceptance process has been completed, then it transmits a message such as "Thank you", whereafter it ends the process.

If the CPU 121 determines in step S152 that the order acceptance process has not been completed, then the process advances to step S153.

In step S153, the CPU 121 determines whether the amount of processing being executed at present exceeds a reference value set in advance. If the CPU 121 determines that the processing amount does not exceed the reference value, then the process returns to step S152.

If the CPU 121 determines in step S153 that the processing amount being executed at present exceeds the reference value set in advance (reference processing capacity) because, for example, order information is transmitted thereto in a concentrated manner from a large number of hard disk recorders, then the process advances to step S154.

If the processing amount being executed at present exceeds the reference value and an order is received from a hard disk recorder 3, then the CPU 121 predicts, in step S154, the shortest time (processing waiting time) before it becomes possible to accept the order information.

In step S155, the CPU 121 transmits the processing waiting time predicted in step S154 from the communication section 130 to the hard disk recorder 3. Together with this, the CPU 121 transmits a message to urge the user of the hard disk recorder 3 to select whether the user wants to wait until the processing waiting time has elapsed.

In step S156, the CPU 121 determines, based on information transmitted thereto from the hard disk recorder 3, whether the user has chosen to wait. The CPU 121 repeats the request by the process in step S155 until it is determined that the user has chosen to wait (transmitted by the process in step S188 of FIG. 23).

If the CPU 121 determines in step S156 that the user of the hard disk recorder 3 has chosen to wait, then the process advances to step S157.

In step S157, the CPU 121 issues to the hard disk recorder 3 an instruction to play back an alternative stream (recorded program) recorded on the hard disk 43 for a time until the processing waiting time has elapsed.

FIG. 22B illustrates a configuration of a stream when an instruction by the process in step S157 has been executed by the hard disk recorder 3. The example shown is a stream in a case where, when 8 minutes elapse after a commodity guide program is played back by the hard disk recorder 3, the processing amount of the management server 10 exceeds the reference value and an instruction to play back an alternative stream is issued to the hard disk recorder 3. Further, in the present example, the processing waiting time calculated by the management server 10 by the process in step S154 is 5 minutes, and for a time until the processing waiting time elapses, the hard disk recorder 3 plays back a recorded program recorded on the hard disk 43 for 5 minutes. It is to be noted that, if the commodity presented in the commodity guide program is, for example, an automobile, the hard disk recorder 3 refers to genre information recorded corresponding to program streams to select an alternative stream (of the same genre) which is most related to the commodity being presented in the program such as to select an alternative stream whose program contents are an automobile race.

In step S158, the CPU 121 waits until the processing waiting time has elapsed. The CPU 121 causes the alternative stream to be played back until the processing waiting time has elapsed.

If the CPU 121 determines in step S158 that the processing waiting time has elapsed, then the process advances to step S159, in which the CPU 121 issues to the hard disk recorder 3 an instruction to stop the playback of the alternative stream and perform the suspended playback of the program stream. In particular, as seen in FIG. 22B, in accordance with the playback instruction by the process in step S159, the hard disk recorder 3 resumes playback of the commodity guide program which has been suspended for 7 minutes. Thereafter, the process returns to step S152 so that the process in the steps beginning with step S152 is executed repetitively.

Now, a commodity ordering process of the hard disk recorder 3 is described with reference to FIGS. 23 and 24.

Figure 23:
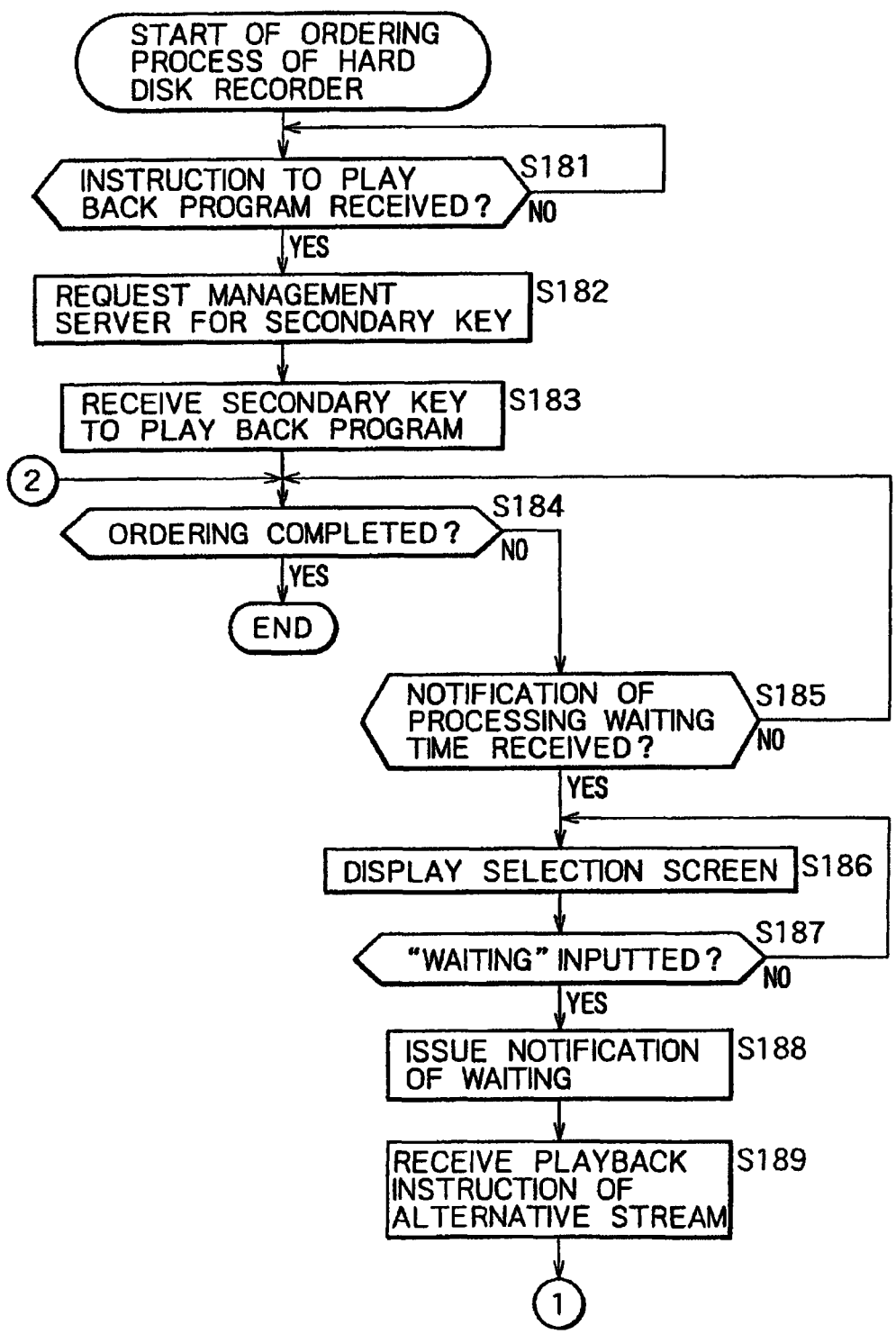
FIGS. 23 and 24 are flowcharts illustrating an ordering process of the hard disk recorder.

Referring first to FIG. 23, in step S181, the CPU 39 determines whether an instruction to play back a commodity guide program has been input from the inputting section 46 by the user. The CPU 39 waits until an instruction is input by the user, and if it determines that an instruction has been input, then the process advances to step S182.

In step S182, the CPU 39 issues a request to the management server 10 through the communication section 40 for a secondary key for playing back the commodity guide program recorded on the hard disk 43.

In step S183, the CPU 39 receives a secondary key transmitted thereto from the management server 10 through the communication section 40 and stores the secondary key in the storage section of the secondary key cancellation section 49, whereafter it decrypts (descrambles) and plays back the commodity guide program stored on the hard disk 43.

Then in step S184, the CPU 39 receives necessary information input from the inputting section 46 by the user based on an application screen displayed at the end of the commodity guide program and determines whether the ordering of commodities has been completed. If the CPU 39 determines that the ordering of commodities has been completed, then the CPU 39 causes a message such as "Thank you" transmitted thereto from the management server 10 to be displayed, and then ends the process.

If the CPU 39 determines in step S184 that the ordering of commodities has not been completed, then the process advances to step S185.

In step S185, the CPU 39 determines whether a notification of a processing waiting time has been received from the management server 10. If the CPU 39 determines that a notification of a processing waiting time has not been received, then the process returns to step S184.

If the CPU 39 determines in step S185 that a notification of a processing waiting time has been received from the management server 10, then the process advances to step S186.

In step S186, the CPU 39 controls the monitor to display a selection screen for allowing the user to select whether the user wants to wait enjoying a program recorded on the hard disk 43 for a period until the processing waiting time has elapsed. Information of the selection screen has been transmitted from the management server 10 together with the notification of the processing waiting time.

In step S187, the CPU 39 determines based on information input thereto from the inputting section 46 whether the user has chosen to wait. If the CPU 39 determines that the user does not want to wait, then the process returns to step S186.

If the CPU 39 determines in step S187 that the user has chosen to wait, then the process advances to step S188.

In step S188, the CPU 39 issues to the management server 10 a notification that it will wait for a time until the processing waiting time has elapsed.

Figure 21:
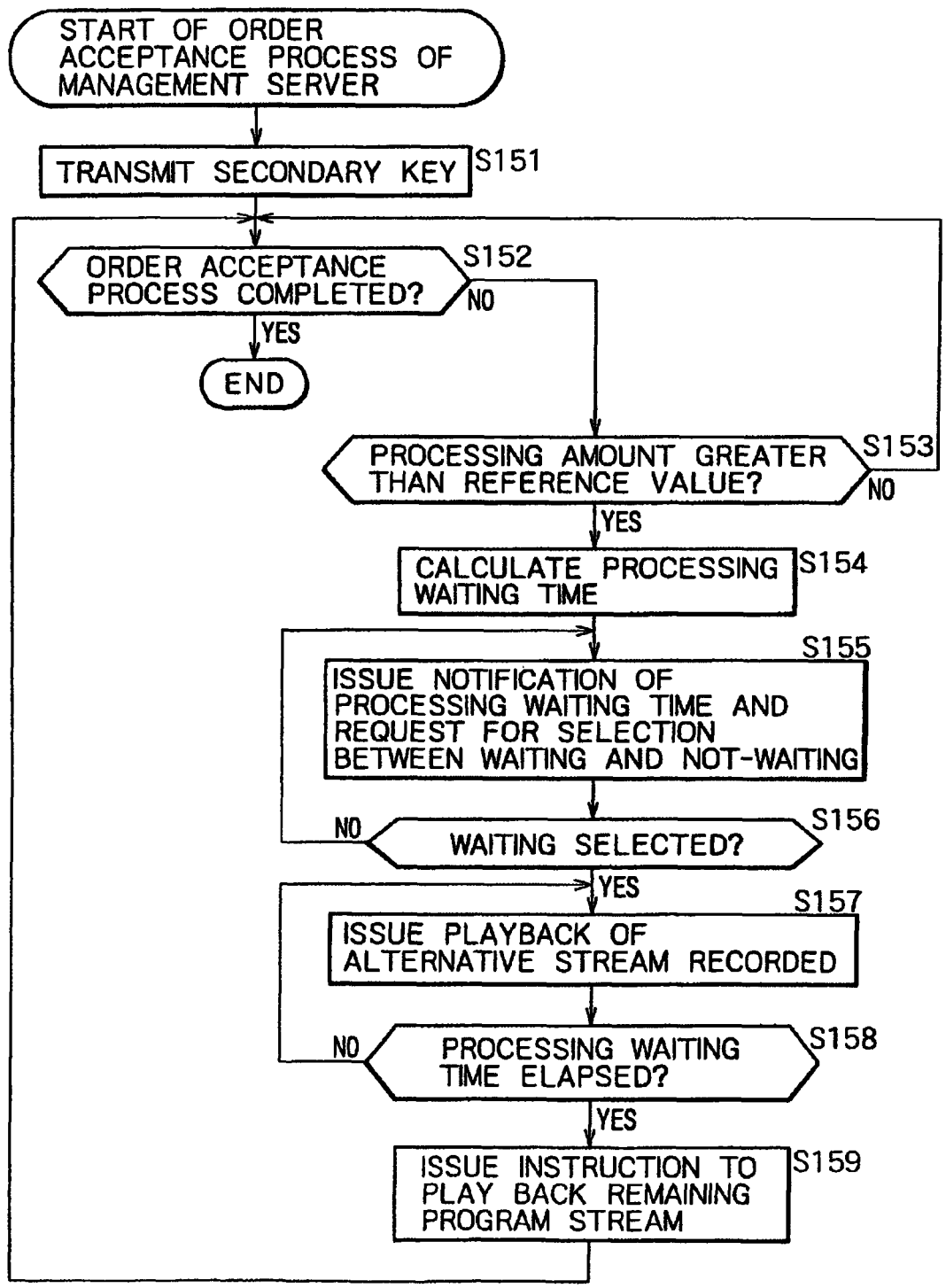
FIG. 21 is a flowchart illustrating an order acceptance process of the management server.

In step S189, the CPU 39 receives, by the communication section 40 thereof, an instruction transmitted thereto from the management server 10 and indicating that an alternative stream (recorded program) recorded on the hard disk 43 is being played back, that is, an instruction sent from the management server 10 by the process in step S157 of FIG. 21.

Figure 24:
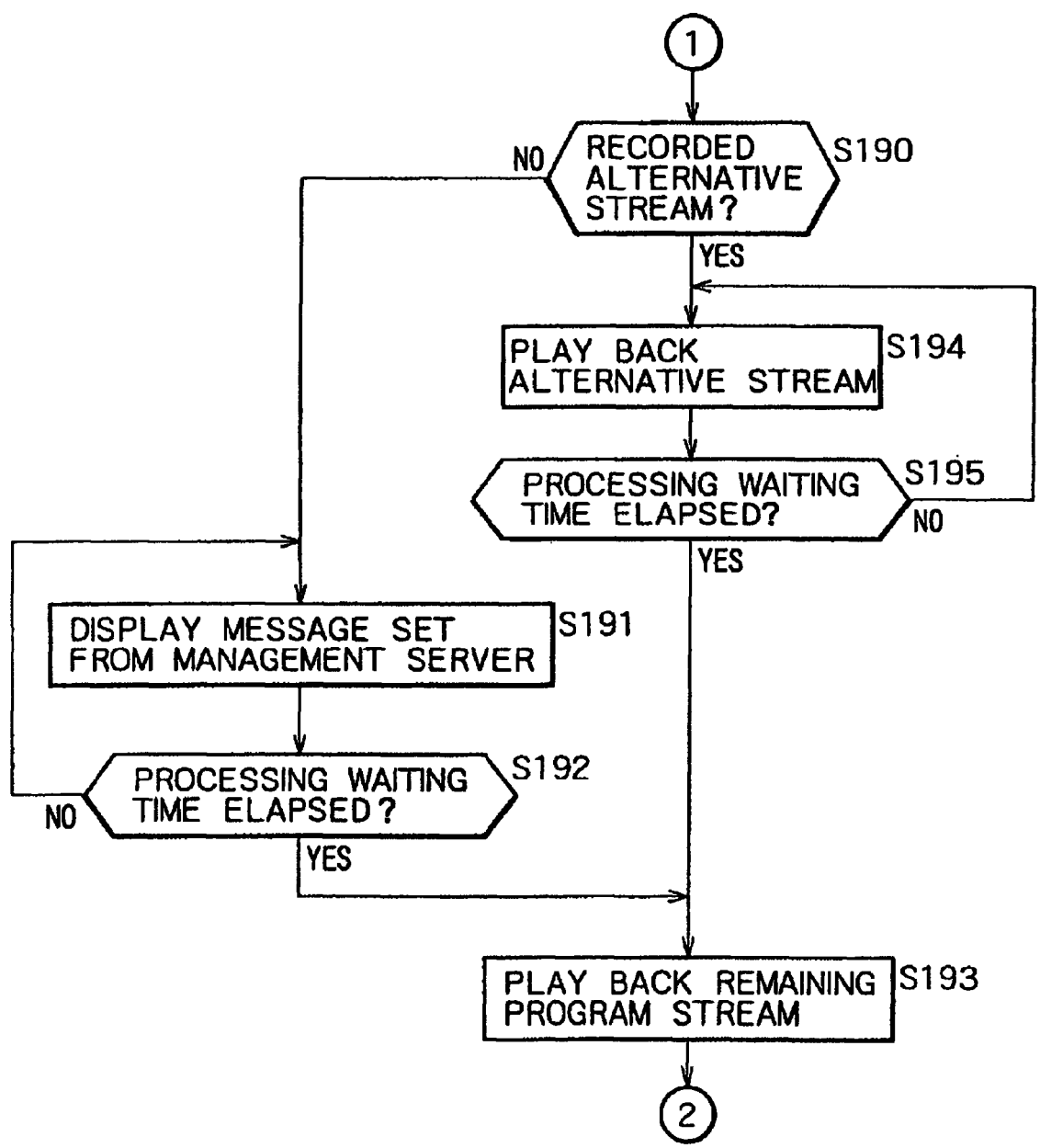

Referring now to FIG. 24, in step S190, the CPU 39 determines whether an alternative stream has been recorded on the hard disk 43. If the CPU 39 determines that no alternative stream has been recorded on the hard disk 43, then the process advances to step S191.

In step S191, the CPU 39 controls the monitor to display a message such as "Please wait a minute!" set in advance by the management server 10. The message information displayed on the monitor is included in the data of the commodity guide program broadcast by the broadcasting business unit 1 and is recorded on the hard disk 43 together with the commodity guide program. In other words, in the example of FIG. 22B, the message is displayed in place of the playback of the recorded program for 5 minutes.

In step S192, the CPU 39 determines whether the processing waiting time has elapsed. The CPU 39 waits in the state wherein it controls the monitor to keep the message displayed until the processing waiting time has elapsed. Then, if the CPU 39 determines that the processing waiting time has elapsed, the process advances to step S193.

On the other hand, if the CPU 39 determines in step S190 that an alternative stream has been recorded on the hard disk 43, then the process advances to step S194.

In step S194, the CPU 39 plays back an alternative stream recorded on the hard disk 43.

In step S195, the CPU 39 determines whether the processing waiting time has elapsed. If the CPU 39 determines that the processing waiting time has elapsed as a result of the playback of the alternative stream being continued until the processing waiting time has elapsed, then the process advances to step S193.

In step S193, the CPU 39 plays back the remaining program stream in accordance with an instruction from the management server 10. Thereafter, the process returns to step S184 so that the process in the steps beginning with step S184 is executed repetitively.

In the foregoing description, when the management server 10 cannot execute an order acceptance process, a program recorded on the hard disk 43 of the hard disk recorder 3 is played back during the processing waiting time. Alternatively, however, program data transmitted from the management server 10 (or where the management server 10 cannot process, another server which receives an instruction from the management server 10) may be played back. This makes it possible for the user to await completion of the processing waiting time while enjoying the program even if no program data has been recorded on the hard disk 43.

Further, external accessing may be limited not only with regard to a commodity order acceptance process, but also with regard to other various processes.

While the series of processes described above can be executed by hardware, it may otherwise be executed by software. Where the series of processes is executed by software, a program which constructs the software is installed from a recording medium into a computer incorporated in hardware for exclusive use or, for example, a personal computer 17 for universal use which can execute various functions by installing various programs.

The software for executing the series of processes is supplied from the magnetic disk 102, optical disk 103, magneto-optical disk 104 or semiconductor memory 105 shown in FIG. 7 to the personal computer 17, read out by the drive 101 and installed into a hard disk drive built in the storage section 99. The agent program installed in the storage section 99 is loaded from the storage section 99 into the RAM 93 in accordance with an instruction of the CPU 91 corresponding to a command from the user input from the inputting section 96, and is executed by the CPU 91.

It is to be noted that, in the present specification, the steps which describe a program recorded in or on a recording medium may be, but need not necessarily be, processed in a time series in the order as described, and may also include processes which are executed parallelly or individually without being processed in a time series.

Further, the term "system" in the present specification is used to signify an entire apparatus composed of a plurality of apparatus.

While a preferred embodiment of the present invention has been described using specific terms, such description is for illustrative purposes only, and it is to be understood that changes and variations may be made without departing from the spirit or scope of the following claims.

The invention claimed is:

1. An information recording apparatus, comprising:
a recording unit operable to determine the data amount of new content to be recorded, to determine whether a current free recording capacity of a recording medium is sufficient to record the new content based on the data amount of the new content, and to record the new content onto the recording medium in response to said recording unit determining that the current free recording capacity of the recording medium is sufficient to record the new content;
a storage unit operable to store terminal information for contacting an information processing terminal;
a notification unit operable to acquire, from the storage unit, the terminal information for contacting the information processing terminal and to send, over a network to the information processing terminal using the terminal information, a notification indicating the current free recording capacity of the recording medium is insufficient to record the new content, wherein the notification is sent based on a result of a determination whether another notification is received that a response from the information processing terminal to a request, the request being provided over the network to the information processing terminal and associated with provision of service to execute unattended recording of the new content onto the recording medium when a determination by the recording unit is that the current free recording capacity of the recording medium is insufficient to record the new content, is received before a predetermined time elapses after the request is provided;
a receiver operable to receive the another notification and a user-entered instruction transmitted over the network by the information processing terminal;
a processor operable to control said recording unit, based on the user-entered instruction, to process, at least a portion of prior content previously recorded on the recording medium; and
wherein the unattended recording of the new content onto the recording medium is preset at the information processing terminal, a genre is designated at the information processing terminal, and content found to belong to the designated genre is preset as the new content to be recorded unattended onto the recording medium,
the recording unit determines whether the current free recording capacity of the recording medium is sufficient to record the new content prior to the unattended recording of the new content, and
said receiver receives the user-entered instruction in an e-mail message.

2. An information recording apparatus according to claim 1, wherein a plurality of titles is associated with the prior content, said receiver is operable to receive a request for a list of the plurality of titles associated with the prior content, the list request being transmitted over the network by the information processing terminal in response to the information processing terminal receiving the notification, and said notification unit is operable to send the list of the plurality of titles associated with the prior content over the network to the information processing terminal in response to the list request.

3. An information recording apparatus according to claim 2, wherein said receiver is operable to receive a request for detailed information regarding a selected one of the plurality of titles associated with the prior content, the detailed information request being transmitted over the network by the information processing terminal in response to the information processing terminal receiving the list of the plurality of titles associated with the prior content, and said notification unit is operable to send the detailed information regarding the selected one of the plurality of titles associated with the prior content over the network to the information processing terminal in response to the detailed information request.

4. An information recording apparatus according to claim 3, wherein the instruction received by said receiver includes a request to erase the selected one of the plurality of titles associated with the prior content, the instruction being transmitted over the network by the information processing terminal in response to the information processing terminal receiving the detailed information regarding the selected one of the plurality of titles, and said processor is operable to control said recording unit to erase the selected one of the plurality of titles based on the instruction.

5. A method for recording new content onto a recording medium, the method comprising:
storing terminal information for contacting an information processing terminal;
determining the data amount of the new content;
determining, based on the data amount of the new content, whether the current free recording capacity of the recording medium is sufficient to record the new content;
in response to determining that the current free recording capacity of the recording medium is sufficient, recording the new content onto the recording medium;
in response to determining that the current free recording capacity of the recording medium is insufficient,
acquiring the stored terminal information for contacting the information processing terminal,
sending, over a network to the information processing terminal using the terminal information, a notification indicating the current free recording capacity of the recording medium is insufficient to record the new content, wherein the notification is sent based on a result of a determination whether another notification is received that a response from the information processing terminal to a request, the request being provided over the network to the information processing terminal and associated with provision of service to execute unattended recording of the new content onto the recording medium when a determination by the recording unit is that the current free recording capacity of the recording medium is insufficient to record the new content, is received before a predetermined time elapses after the request is provided,
receiving the another notification and a user-entered instruction transmitted over the network by the information processing terminal, and
processing at least a portion of prior content recorded on the recording medium based on the instruction;
wherein the unattended recording of the new content onto the recording medium is preset at the information processing terminal, a genre is designated at the information processing terminal, and content found to belong to the designated genre is preset as the new content to be recorded unattended onto the recording medium, the step of determining whether the current free recording capacity of the recording medium is sufficient to record the new content is carried out prior to the unattended recording of the new content, and the receiving step receives the user-entered instruction in an e-mail message.

6. A method according to claim 5, wherein a plurality of titles is associated with the prior content, and said method further comprises:

receiving a request for a list of the plurality of titles associated with the prior content, the list request being transmitted over the network by the information processing terminal in response to the information processing terminal receiving the notification, and sending the list of the plurality of titles associated with the prior content over the network to the information processing terminal in response to the list request.

7. A method according to claim 6, further comprising:

receiving a request for detailed information regarding a selected one of the plurality of titles associated with the prior content, the detailed information request being transmitted over the network by the information processing terminal in response to the information processing terminal receiving the list of the plurality of titles associated with the prior content, and sending the detailed information regarding the selected one of the plurality of titles associated with the prior content over the network to the information processing terminal detailed information request.

8. A method according to claim 7, wherein the instruction includes a request to erase the selected one of the plurality of titles associated with the prior content, the instruction being transmitted over the network by the information processing terminal in response to the information processing terminal receiving the detailed information regarding the selected one of the plurality of titles, and said processing step includes erasing the selected one of the plurality of titles based on the instruction.

9. A non-transitory computer-readable recording medium recorded with a program for carrying out a method of recording new content onto a recording medium, said method comprising:

storing terminal information for contacting an information processing terminal;

determining the data amount of the new content;

determining, based on the data amount of the new content, whether the current free recording capacity of the recording medium is sufficient to record the new content;

in response to determining that the current free recording capacity of the recording medium is sufficient, recording the new content onto the recording medium; and in response to determining that the current free recording capacity of the recording medium is insufficient, acquiring the stored terminal information for contacting the information processing terminal, sending, over a network to the information processing terminal using the terminal information, a notification indicating the current free recording capacity of the recording medium is insufficient to record the new content, wherein the notification is sent based on a result of a determination whether another notification is received that a response from the information processing terminal to a request, the request being provided over the network to the information processing terminal and associated with provision of service to execute unattended recording of the new content onto the recording medium when a determination by the recording unit is that the current free recording capacity of the recording medium is insufficient to record the new content, is received before a predetermined time elapses after the request is provided, receiving the another notification and a user-entered instruction transmitted over the network by the information processing terminal, and processing at least a portion of prior content recorded on the recording medium based on the user-entered instruction;

wherein the unattended recording of the new content onto the recording medium is preset at the information processing terminal, a genre is designated at the information processing terminal, and content found to belong to the designated genre is preset as the new content to be recorded unattended onto the recording medium, the step of determining whether the current free recording capacity of the recording medium is sufficient to record the new content is carried out prior to the unattended recording of the new content, and the receiving step receives the user-entered instruction in an e-mail message.

10. A non-transitory computer-readable recording medium according to claim 9, wherein a plurality of titles is associated with the prior content, and said method further comprises:

receiving a request for a list of the plurality of titles associated with the prior content, the list request being transmitted over the network by the information processing terminal in response to the information processing terminal receiving the notification, and sending the list of the plurality of titles associated with the prior content over the network to the information processing terminal in response to the list request.

11. A non-transitory computer-readable recording medium according to claim 10, wherein said method further comprises:

receiving a request for a list of the plurality of titles associated with the prior content, the list request being transmitted over the network by the information processing terminal in response to the information processing terminal receiving the notification, and sending the list of the plurality of titles associated with the prior content over the network to the information processing terminal in response to the list request.

12. A non-transitory computer-readable recording medium according to claim 11, wherein the instruction includes a request to erase the selected one of the plurality of titles associated with the prior content, the instruction being transmitted over the network by the information processing terminal in response to the information processing terminal receiving the detailed information regarding the selected one of the plurality of titles, and said processing step includes erasing the selected one of the plurality of titles based on the instruction.

13. A system, comprising:

an information recording apparatus; and an information processing terminal connected over a network to the information recording apparatus;

the information recording apparatus including:

a recording unit operable to determine the data amount of new content to be recorded, to determine whether a current free recording capacity of a recording medium is sufficient to record the new content based on the data amount of the new content, and to record the new content onto the recording medium in response to said recording unit determining that the current free recording capacity of the recording medium is sufficient, a storage unit operable to store terminal information for contacting an information processing terminal, a notification unit operable to acquire, from the storage unit, the terminal information for contacting the information processing terminal and to send, over a network to the information processing terminal using the terminal information, a notification indicating the current free recording capacity of the recording medium is insufficient to record the new content, wherein the notification is sent based on a result of a determination whether another notification is received that a response from the information processing terminal to a request, the request being provided over the network to the information processing terminal and associated with provision of service to execute unattended recording of the new content onto the recording medium when a determination by the recording unit is that the current free recording capacity of the recording medium is insufficient to record the new content, is received before a predetermined time elapses after the request is provided;

the information processing terminal including:

a receiver operable to receive a notification over the network from the information recording apparatus when the recording unit determines that the recording medium currently has insufficient free capacity to record the new content, a display unit operable to display the notification, an instruction unit operable to receive at least one user-entered instruction for controlling the recording unit, a transmitter operable to transmit the at least one user-entered instruction over the network to the information recording apparatus, the information recording apparatus thereby controlling the recording unit to process at least a portion of prior content previously recorded on the recording medium, and a presetting unit operable to preset the unattended recording of the new content onto the recording medium, and to search for content which belongs to a designated genre, wherein at least part of any content found to belong to the designated genre is preset as the new content to be recorded unattended onto the recording medium, the recording unit of the information recording apparatus determines whether the current free recording capacity of the recording medium is sufficient to record the new content prior to the unattended recording of the new content, and said transmitter transmits the at least one user-entered instruction in an e-mail message.

14. A system according to claim 13, wherein a plurality of titles is associated with the prior content, said instruction unit is operable to receive at least one user-entered instruction for requesting a list of the plurality of titles associated with the prior content in response to the notification, and said transmitter is operable to transmit the request for the list of the plurality of titles associated with the prior content over the network to the information recording apparatus.

15. A system according to claim 14, wherein said receiver is operable to receive the list of the plurality of titles associated with the prior content sent over the network by the information recording apparatus, said display unit is operable to display the plurality of titles, said instruction unit is operable to receive at least one user-entered instruction for requesting detailed information regarding a selected one of the plurality of titles associated with the prior content, and said transmitter is operable to transmit the request for detailed information regarding a selected one of the plurality of titles associated with the prior content over the network to the information recording apparatus.

16. A system according to claim 15, wherein said receiver is operable to receive the detailed information regarding a selected one of the plurality of titles associated with the prior content, said display unit is operable to display the detailed information, said instruction unit is operable to receive at least one user-entered instruction for requesting the information recording apparatus to erase the selected one of the plurality of titles, and said transmitter is operable to transmit the request to erase the selected one of the plurality of titles over the network to the information recording apparatus.

17. A system according to claim 13, wherein said information processing terminal is a wireless telephone, and the network includes a wireless network.

18. A system according to claim 13, wherein the network includes a cellular network, and said information processing terminal is a cellular phone.

19. A system according to claim 13, wherein the network includes a wired network, and said information processing terminal is a computer.

20. A method of operating an information processing terminal connected over a network to an information recording apparatus, the information recording apparatus including a recording unit, said method comprising:

storing, at the information recording apparatus, terminal information for contacting an information processing terminal;

determining, at the information recording apparatus, the data amount of new content to be recorded;

determining, at the information recording apparatus based on the data amount of the new content, whether the current free recording capacity of the recording medium is sufficient to record the new content;

in response to determining at the information recording apparatus that the current free recording capacity of the recording medium is sufficient, recording the new content onto the recording medium by the information recording apparatus;

in response to determining at the information recording apparatus that the current free recording capacity of the recording medium is insufficient, acquiring, at the information recording apparatus, the stored terminal information for contacting the information processing terminal, sending, from the information recording apparatus over a network to the information processing terminal using the terminal information, a notification indicating the current free recording capacity of the recording medium is insufficient to record the new content, wherein the notification is sent based on a result of a determination whether another notification is received that a response from the information processing terminal to a request, the request being provided over the network to the information processing terminal and associated with provision of service to execute unattended recording of the new content onto the recording medium when a determination by the recording unit is that the current free recording capacity of the recording medium is insufficient to record the new content, is received before a predetermined time elapses after the request is provided, receiving, at the information processing terminal, the notification over the network from the information recording apparatus, displaying the notification at the information processing terminal, receiving, at the information processing terminal, at least one user-entered instruction for controlling the recording unit, and transmitting the at least one user-entered instruction over the network from the information processing terminal to the information recording apparatus, the information recording apparatus thereby controlling the recording unit to process at least a portion of prior content previously recorded on the recording medium;

presetting, at the information processing terminal, the unattended recording of the new content onto the recording medium; and searching for content which belongs to a designated genre at the information processing terminal, wherein at least part of any content found to belong to the designated genre is preset as the new content to be recorded unattended onto the recording medium, the step of determining whether the current free recording capacity of the recording medium is sufficient to record the new content is carried out prior to the unattended recording of the new content, and said transmitting step transmits the at least one user-entered instruction in an e-mail message.

21. A method of operating an information processing terminal according to claim 20, wherein a plurality of titles is associated with the prior content, and said method further comprises:

receiving, at the information processing terminal, at least one user-entered instruction for requesting a list of the plurality of titles associated with the prior content in response to the notification, and transmitting the request for the list of the plurality of titles associated with the prior content from the information processing terminal over the network to the information recording apparatus.

22. A method of operating an information processing terminal according to claim 21, further comprising:

receiving, at the information processing terminal, the list of the plurality of titles associated with the prior content sent over the network by the information recording apparatus, displaying the plurality of titles at the information processing terminal, receiving, at the information processing terminal, at least one user-entered instruction for requesting detailed information regarding a selected one of the plurality of titles associated with the prior content, and transmitting the request for detailed information regarding a selected one of the plurality of titles associated with the prior content from the information processing terminal over the network to the information recording apparatus.

23. A method of operating an information processing terminal according to claim 22, further comprising:

receiving, at the information processing terminal, the detailed information regarding a selected one of the plurality of titles associated with the prior content, displaying the detailed information at the information processing terminal, receiving, at the information processing terminal, at least one user-entered instruction for requesting the information recording apparatus to erase the selected one of the plurality of titles, and transmitting the request to erase the selected one of the plurality of titles from the information processing terminal over the network to the information recording apparatus.

24. A method of operating an information processing terminal according to claim 20, wherein the information processing terminal is a wireless telephone, the network includes a wireless network, and said method is carried out using the wireless telephone.

25. A method of operating an information processing terminal according to claim 20, wherein the network includes a cellular network, the information processing terminal is a cellular phone, and said method is carried out using the cellular phone.

26. A method of operating an information processing terminal according to claim 20, wherein the network includes a wired network, the information processing terminal is a computer, and said method is carried out using the computer.

27. A non-transitory computer-readable recording medium recorded with a program for carrying out a method of operating an information processing terminal connected over a network to an information recording apparatus, the information recording apparatus including a recording unit, said method comprising:

storing, at the information recording apparatus, terminal information for contacting an information processing terminal;

determining, at the information recording apparatus, the data amount of new content to be recorded;

determining, at the information recording apparatus based on the data amount of the new content, whether the current free recording capacity of the recording medium is sufficient to record the new content;

in response to determining at the information recording apparatus that the current free recording capacity of the recording medium is sufficient, recording the new content onto the recording medium by the information recording apparatus;

in response to determining at the information recording apparatus that the current free recording capacity of the recording medium is insufficient, acquiring, at the information recording apparatus, the stored terminal information for contacting the information processing terminal, sending, from the information recording apparatus over a network to the information processing terminal using the terminal information, a notification indicating the current free recording capacity of the recording medium is insufficient to record the new content, wherein the notification is sent based on a result of a determination whether another notification is received that a response from the information processing terminal to a request, the request being provided over the network to the information processing terminal and associated with provision of service to execute unattended recording of the new content onto the recording medium when a determination by the recording unit is that the current free recording capacity of the recording medium is insufficient to record the new content, is received before a predetermined time elapses after the request is provided, receiving, at the information processing terminal, the notification over the network from the information recording apparatus, displaying the notification at the information processing terminal, receiving, at the information processing terminal, at least one user-entered instruction for controlling the recording unit, and transmitting the at least one user-entered instruction over the network from the information processing terminal to the information recording apparatus, the information recording apparatus thereby controlling the recording unit to process at least a portion of prior content previously recorded on the recording medium;

presetting, at the information processing terminal, the unattended recording of the new content onto the recording medium; and searching for content which belongs to a designated genre at the information processing terminal, wherein at least part of any content found to belong to the designated genre is preset as the new content to be recorded unattended onto the recording medium, the step of determining whether the current free recording capacity of the recording medium is sufficient to record the new content is carried out prior to the unattended recording of the new content, and said transmitting step transmits the at least one user-entered instruction in an e-mail message.

28. A non-transitory computer-readable recording medium according to claim 27, wherein a plurality of titles is associated with the prior content, and said method further comprises:

receiving, at the information processing terminal, at least one user-entered instruction for requesting a list of the plurality of titles associated with the prior content in response to the notification, and transmitting the request for the list of the plurality of titles associated with the prior content from the information processing terminal over the network to the information recording apparatus.

29. A non-transitory computer-readable recording medium according to claim 28, wherein said method further comprises:

receiving, at the information processing terminal, the list of the plurality of titles associated with the prior content sent over the network by the information recording apparatus, displaying the plurality of titles at the information processing terminal, receiving, at the information processing terminal, at least one user-entered instruction for requesting detailed information regarding a selected one of the plurality of titles associated with the prior content, and transmitting the request for detailed information regarding a selected one of the plurality of titles associated with the prior content from the information processing terminal over the network to the information recording apparatus.

30. A non-transitory computer-readable recording medium according to claim 29, wherein said method further comprises:

receiving, at the information processing terminal, the detailed information regarding a selected one of the plurality of titles associated with the prior content, displaying the detailed information at the information processing terminal, receiving, at the information processing terminal, at least one user-entered instruction for requesting the information recording apparatus to erase the selected one of the plurality of titles, and transmitting the request to erase the selected one of the plurality of titles from the information processing terminal over the network to the information recording apparatus.

31. An information processing apparatus connected over a network to an information recording apparatus and to an information processing terminal, the information recording apparatus including a recording unit, the information processing terminal being operable to control the information recording apparatus, said information processing apparatus comprising:

a receiver operable to receive a first notification transmitted over the network by the information recording apparatus in response to the recording unit determining the data amount of new content to be recorded and that the current free recording capacity of the recording medium is insufficient based on the data amount of the new content;

a transmitter operable to transmit, over the network to the information processing terminal, a request and a second notification indicating receipt of the first notification by said receiver, wherein the request is associated with provision of service to execute unattended recording of the new content onto the recording medium when a determination by the recording unit is that the current free recording capacity of the recording medium is insufficient to record the new content, wherein the second notification is sent based on a result of a determination whether a third notification is received that a response from the information processing terminal to the request is received before a predetermined time elapses after the request is transmitted;

said receiver being operable to receive a user-entered instruction that is transmitted by the information processing terminal over the network;

said transmitter being operable to transmit, over the network to the information recording apparatus, a signal based on the user-entered instruction, the information recording apparatus thereby controlling the recording unit to process at least a portion of prior content previously recorded on the recording medium; and a presetting unit operable to preset the unattended recording of the new content onto the recording medium, and to search for content which belongs to a designated genre, wherein at least part of any content found to belong to the designated genre is preset as the new content to be recorded unattended onto the recording medium, the recording unit of the information recording apparatus determines that the current free recording capacity of the recording medium is insufficient to record the new content prior to the unattended recording of the new content, and said receiver receives the user-entered instruction in an e-mail message.

32. An information processing apparatus according to claim 31, wherein a plurality of titles is associated with the prior content, said receiver is operable to receive a request for a list of the plurality of titles associated with the prior content, the list request being transmitted over the network by the information processing terminal in response to the information processing terminal receiving the second notification, said transmitter is operable to send the list request over the network to the information recording apparatus, said receiver is operable to receive the list of the plurality of titles associated with the prior content from the information recording apparatus over the network, and said transmitter is operable to send the list of the plurality of titles associated with the prior content over the network to the information processing terminal.

33. An information processing apparatus according to claim 32, wherein said receiver is operable to receive a request for detailed information regarding a selected one of the plurality of titles associated with the prior content, the detailed information request being transmitted over the network by the information processing terminal in response to the information processing terminal receiving the list of the plurality of titles associated with the prior content, said transmitter unit is operable to send the detailed information request over the network to the information recording apparatus, said receiver is operable to receive the detailed information regarding the selected one of the plurality of titles associated with the prior content from the information recording apparatus over the network, and said transmitter unit is operable to send the detailed information regarding the selected one of the plurality of titles associated with the prior content over the network to the information processing terminal.

34. An information processing apparatus according to claim 33, wherein the instruction received by said receiver includes a request to erase the selected one of the plurality of titles associated with the prior content, the erasure request being transmitted over the network by the information processing terminal in response to the information processing terminal receiving the detailed information regarding the selected one of the plurality of titles, and the signal transmitted by said transmitter causes the recording unit to erase the selected one of the plurality of titles associated with the prior content.

35. A method of operating an information processing apparatus connected over a network to an information recording apparatus and to an information processing terminal, the information recording apparatus including a recording unit, the information processing terminal being operable to control the information recording apparatus, said method comprising:
    receiving a first notification transmitted over the network by the information recording apparatus in response to the recording unit determining the data amount of new content to be recorded and that the current free recording capacity of the recording medium is insufficient based on the data amount of the new content;
    transmitting, over the network to the information processing terminal, a request and a second notification indicating receipt of the first notification, wherein the request is associated with provision of service to execute unattended recording of the new content onto the recording medium when a determination by the recording unit is that the current free recording capacity of the recording medium is insufficient to record the new content, wherein the second notification is sent based on a result of a determination whether a third notification is received that a response from the information processing terminal to the request is received before a predetermined time elapses after the request is transmitted;
    receiving a user-entered instruction that is transmitted by the information processing terminal over the network;
    transmitting, over the network to the information recording apparatus, a signal based on the user-entered instruction, thereby controlling the recording unit to process at least a portion of prior content previously recorded on the recording medium;
    presetting the unattended recording of the new content onto the recording medium; and
    searching for content which belongs to a designated genre, wherein at least part of any content found to belong to the designated genre is preset as the new content to be recorded unattended onto the recording medium,
    the recording unit of the information recording apparatus determines that the current free recording capacity of the recording medium is insufficient to record the new content prior to the unattended recording of the new content, and
    said receiving step receives the user-entered instruction in an e-mail message.

36. A method of operating an information processing apparatus according to claim 35, wherein a plurality of titles is associated with the prior content, and said method further comprises:
    receiving a request for a list of the plurality of titles associated with the prior content, the list request being transmitted over the network by the information processing terminal in response to the information processing terminal receiving the second notification,
    sending the list request over the network to the information recording apparatus,
    receiving the list of the plurality of titles associated with the prior content from the information recording apparatus over the network, and
    sending the list of the plurality of titles associated with the prior content over the network to the information processing terminal.

37. A method of operating an information processing apparatus according to claim 36, further comprising:
    receiving a request for detailed information regarding a selected one of the plurality of titles associated with the prior content, the detailed information request being transmitted over the network by the information processing terminal in response to the information processing terminal receiving the list of the plurality of titles associated with the prior content,
    sending the detailed information request over the network to the information recording apparatus,
    receiving the detailed information regarding the selected one of the plurality of titles associated with the prior content from the information recording apparatus over the network, and sending the detailed information regarding the selected one of the plurality of titles associated with the prior content over the network to the information processing terminal.

38. A method of operating an information processing apparatus according to claim 37, wherein the received instruction includes a request to erase the selected one of the plurality of titles associated with the prior content, the erasure request being transmitted over the network by the information processing terminal in response to the information processing terminal receiving the detailed information regarding the selected one of the plurality of titles, and the transmitted signal causes the recording unit to erase the selected one of the plurality of titles associated with the prior content.

39. A non-transitory computer-readable recording medium recorded with a program for carrying out a method of operating an information processing apparatus connected over a network to an information recording apparatus and to an information processing terminal, the information recording apparatus including a recording unit, the information processing terminal being operable to control the information recording apparatus, said method comprising:
    receiving a first notification transmitted over the network by the information recording apparatus in response to the recording unit determining the data amount of new content to be recorded and that the current free recording capacity of the recording medium is insufficient based on the data amount of the new content;
    transmitting, over the network to the information processing terminal, a request and a second notification indicating receipt of the first notification, wherein the request is associated with provision of service to execute unattended recording of the new content onto the recording medium when a determination by the recording unit is that the current free recording capacity of the recording medium is insufficient to record the new content, wherein the second notification is sent based on a result of a determination whether a third notification is received that a response from the information processing terminal to the request is received before a predetermined time elapses after the request is transmitted;

receiving a user-entered instruction that is transmitted by the information processing terminal over the network;

transmitting, over the network to the information recording apparatus, a signal based on the user-entered instruction, thereby controlling the recording unit to process at least a portion of prior content previously recorded on the recording medium;

presetting unattended recording of the new content onto the recording medium; and searching for content which belongs to a designated genre, wherein at least part of any content found to belong to the designated genre is preset as the new content to be recorded unattended onto the recording medium, the recording unit of the information recording apparatus determines that the current free recording capacity of the recording medium is insufficient to record the new content prior to the unattended recording of the new content, and said receiving step receives the user-entered instruction in an e-mail message.

40. A non-transitory computer-readable recording medium of operating an information processing apparatus according to claim 39, wherein a plurality of titles is associated with the prior content, and said method further comprises:

receiving a request for a list of the plurality of titles associated with the prior content, the list request being transmitted over the network by the information processing terminal in response to the information processing terminal receiving the second notification, sending the list request over the network to the information recording apparatus, receiving the list of the plurality of titles associated with the prior content from the information recording apparatus over the network, and sending the list of the plurality of titles associated with the prior content over the network to the information processing terminal.

41. A non-transitory computer-readable recording medium of operating an information processing apparatus according to claim 40, wherein said method further comprises:

receiving a request for detailed information regarding a selected one of the plurality of titles associated with the prior content, the detailed information request being transmitted over the network by the information processing terminal in response to the information processing terminal receiving the list of the plurality of titles associated with the prior content, sending the detailed information request over the network to the information recording apparatus, receiving the detailed information regarding the selected one of the plurality of titles associated with the prior content from the information recording apparatus over the network, and sending the detailed information regarding the selected one of the plurality of titles associated with the prior content over the network to the information processing terminal.

42. A non-transitory computer-readable recording medium of operating an information processing apparatus according to claim 41, wherein the received instruction includes a request to erase the selected one of the plurality of titles associated with the prior content, the erasure request being transmitted over the network by the information processing terminal in response to the information processing terminal receiving the detailed information regarding the selected one of the plurality of titles, and the transmitted signal causes the recording unit to erase the selected one of the plurality of titles associated with the prior content.

* * * * *

UNITED STATES PATENT AND TRADEMARK OFFICE
CERTIFICATE OF CORRECTION

PATENT NO. : 8,755,674 B2
APPLICATION NO. : 11/726809
DATED : June 17, 2014
INVENTOR(S) : Yasuhisa Nakajima and Susumu Masukane It is certified that error appears in the above-identified patent and that said Letters Patent is hereby corrected as shown below:

On the title page, item [54] and in the specification, column 1, in the title, after "TERMINAL", "MEDIUM" should read --METHOD--.

Signed and Sealed this
Nineteenth Day of August, 2014

Michelle K. Lee
*Deputy Director of the United States Patent and Trademark Office*